(12) United States Patent
Walker

(10) Patent No.: US 7,555,816 B2
(45) Date of Patent: Jul. 7, 2009

(54) TOOLBOX LATCH AND HINGE APPARATUS AND METHOD

(76) Inventor: Eric L. Walker, 25107 Allentown Rd., Tremont, IL (US) 61658

( * ) Notice: Subject to any disclaimer, the term of this patent is extended or adjusted under 35 U.S.C. 154(b) by 267 days.

(21) Appl. No.: 11/368,938

(22) Filed: Mar. 6, 2006

(65) Prior Publication Data

US 2006/0191105 A1  Aug. 31, 2006

Related U.S. Application Data

(63) Continuation-in-part of application No. 10/959,232, filed on Oct. 6, 2004, now Pat. No. 7,052,067.

(60) Provisional application No. 60/508,684, filed on Oct. 6, 2003.

(51) Int. Cl.
*E05D 1/04* (2006.01)
(52) U.S. Cl. .......................................... 16/355; 16/269
(58) Field of Classification Search .................... 16/356, 16/355, 267, 268, 269, DIG. 29; 160/44; 220/DIG. 6; 206/349, 372, 373
See application file for complete search history.

(56) References Cited

U.S. PATENT DOCUMENTS

| | | | | |
|---|---|---|---|---|
| 2,658,233 A | * | 11/1953 | Kimmel | 16/269 |
| 2,853,802 A | * | 9/1958 | Seby | 16/356 |
| 3,718,943 A | * | 3/1973 | Bustin | 16/355 |
| 4,315,345 A | * | 2/1982 | Schijf | 16/267 |
| 4,824,162 A | * | 4/1989 | Geisler et al. | 16/269 |
| 4,832,394 A | * | 5/1989 | Macomber | 16/355 |
| 5,111,550 A | * | 5/1992 | LeBlanc | 16/356 |
| 5,845,952 A | | 12/1998 | Albertini et al. | |
| 6,976,290 B2 | | 12/2005 | Boyer et al. | |
| 2005/0145527 A1 | | 7/2005 | Christensen | |

\* cited by examiner

*Primary Examiner*—Victor Batson
*Assistant Examiner*—Jeffrey O'Brien
(74) *Attorney, Agent, or Firm*—Robert C. Haldiman; Husch Blackwell Sanders LLP

(57) ABSTRACT

A toolbox has a novel reverse deadbolt for a latch and hinge. The latch engaging mechanism has attached deadbolts or latching rods which are linearly opposed to each other. Each latch rod mechanism has a hook on the end. This hook effectively reverses the direction of the deadbolt. Thus, when engaged the deadbolt locks around the receiver pins and moves inward. The hinge has a first engaging face that is generally concave radially around a longitudinal axis, and a second engaging face that is generally convex radially around the longitudinal axis. The engaging faces rotate relative to one another around the longitudinal axis in cooperation sufficiently close to allow water to enter them. A passage in the second element is disposed to drain fluid from a fluid communication with the engagement between the engaging faces.

4 Claims, 19 Drawing Sheets

Top View

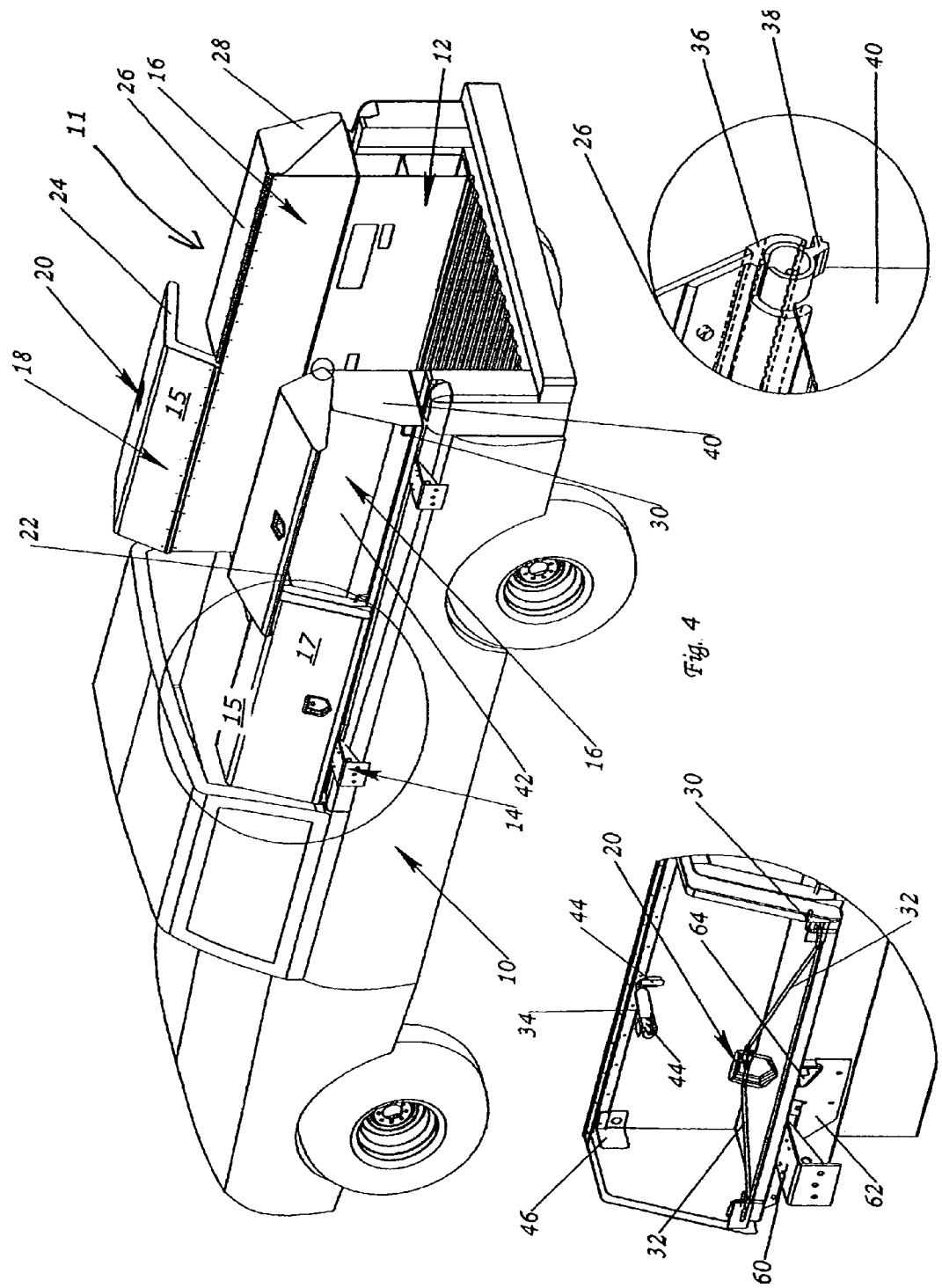

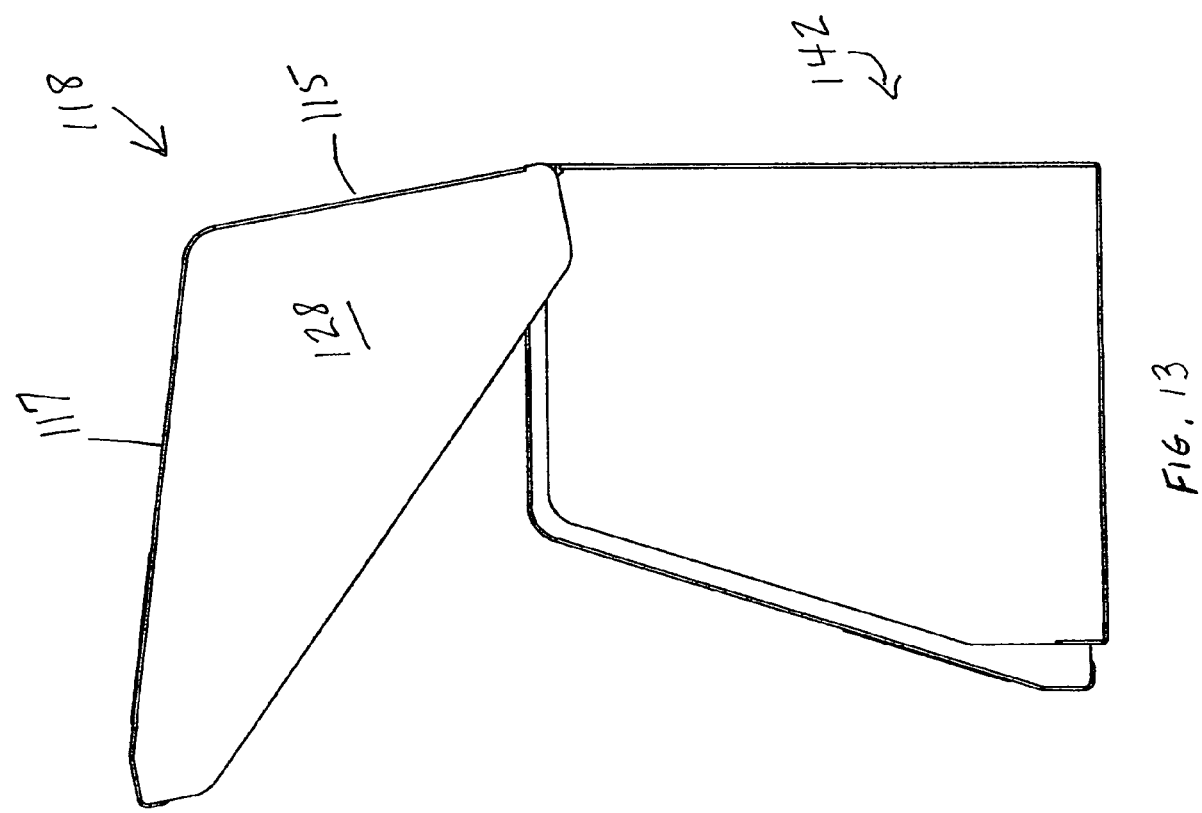

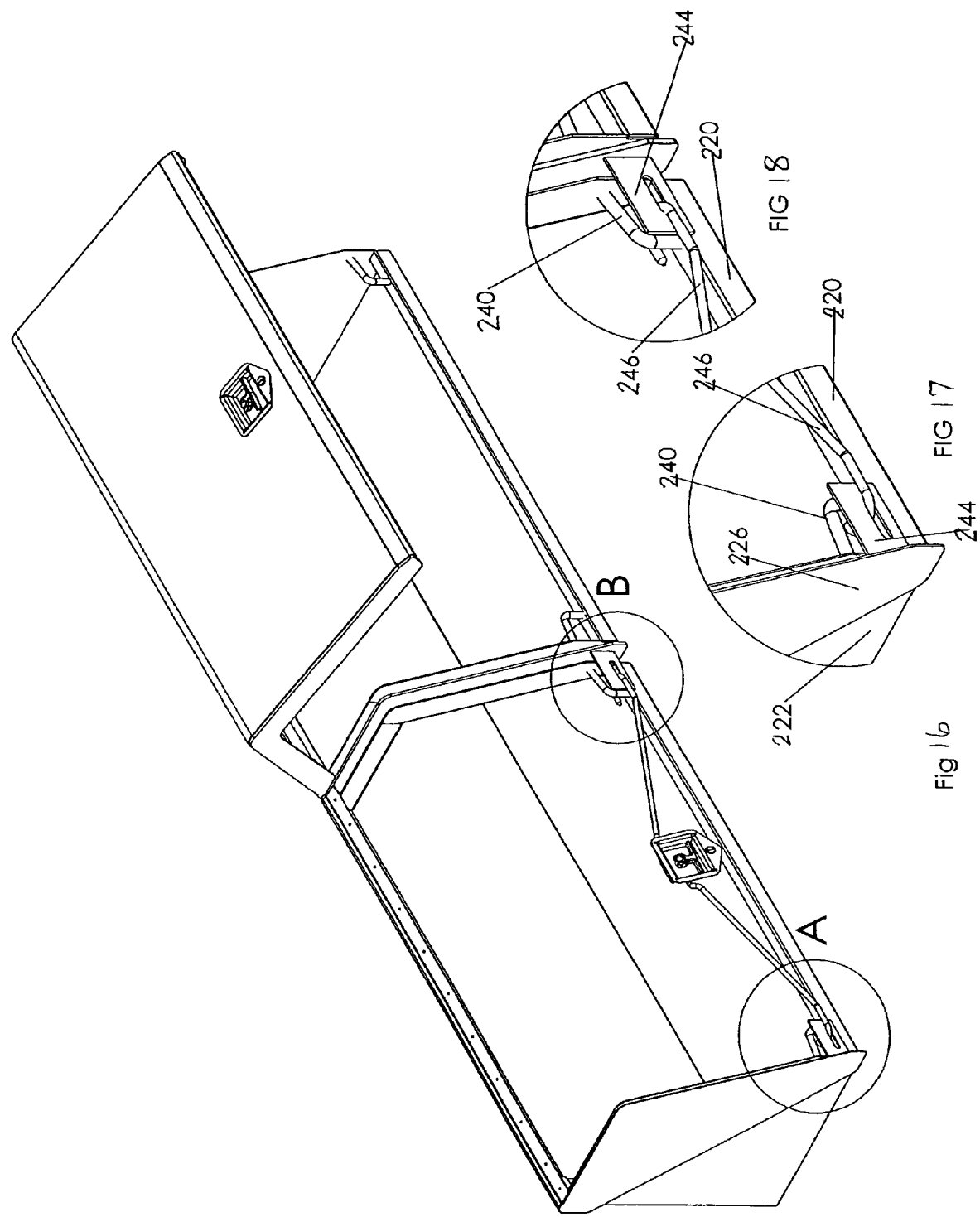

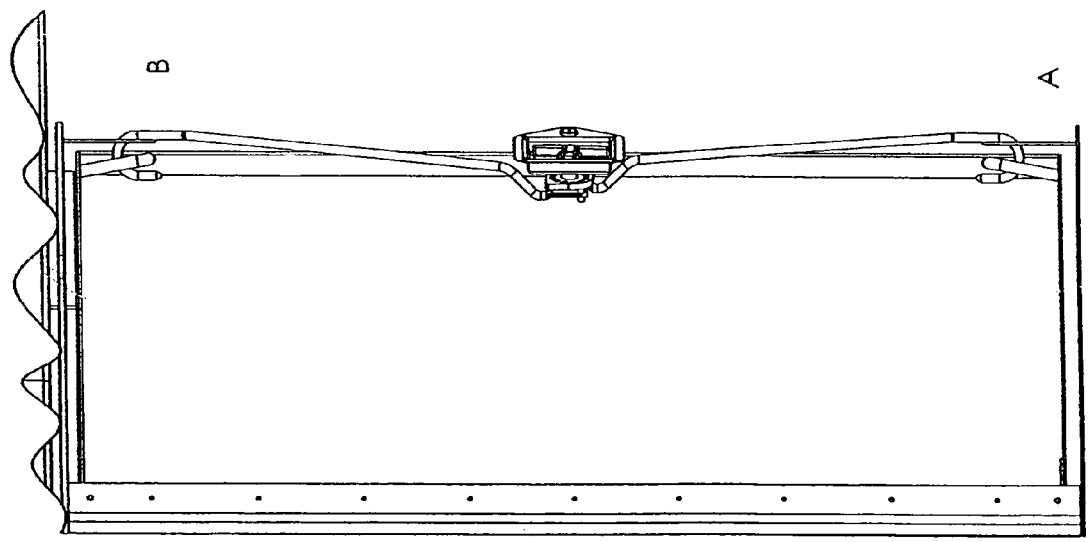
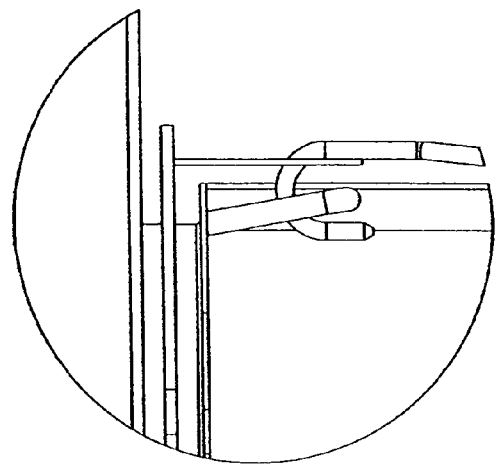
Fig 21
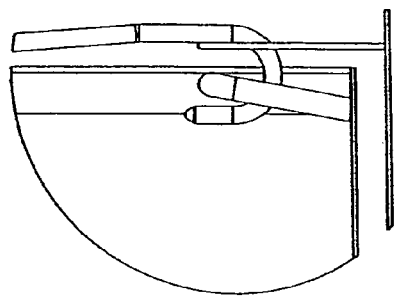
Fig 20
Fig 19

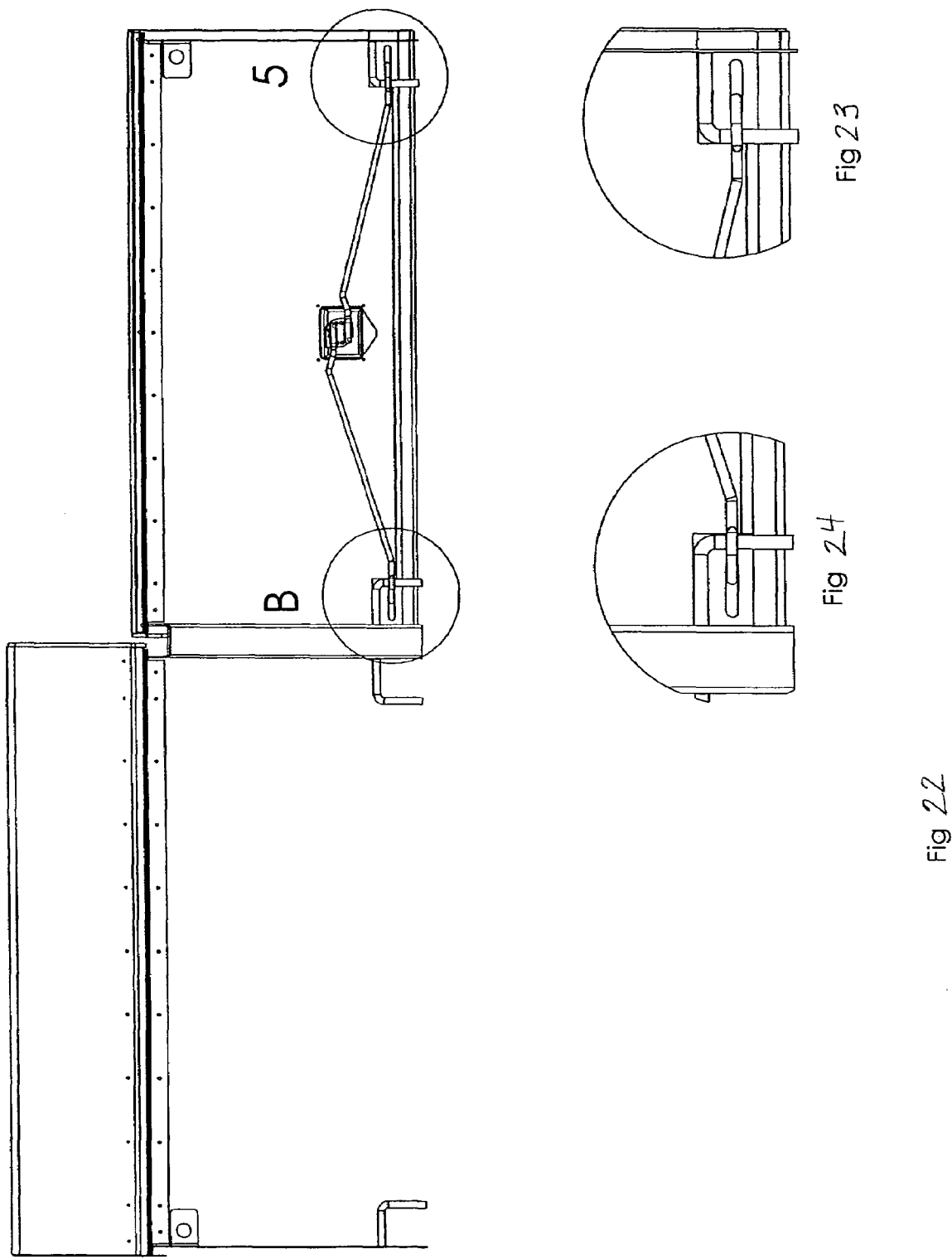

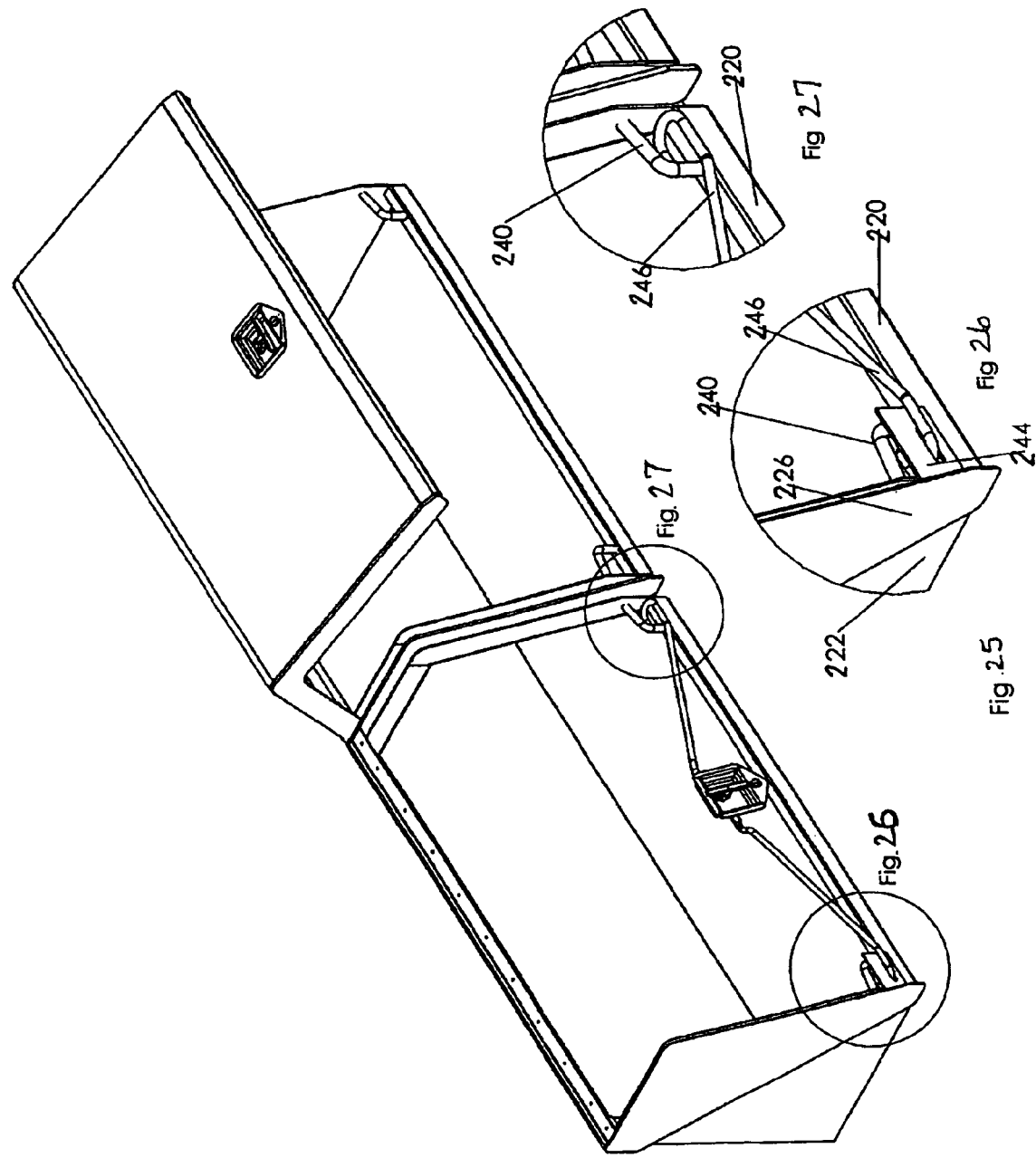

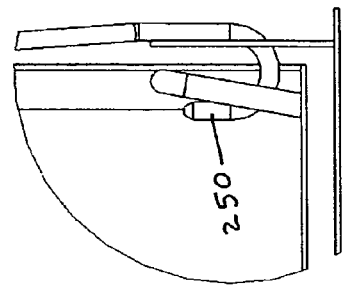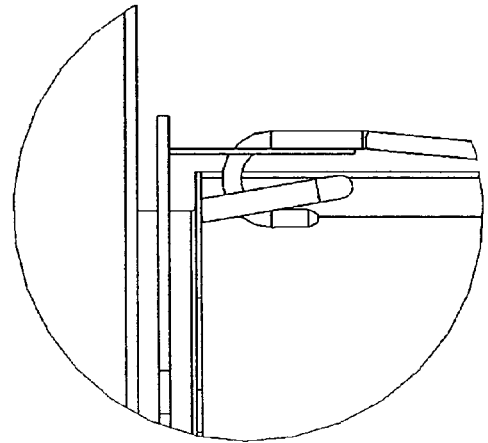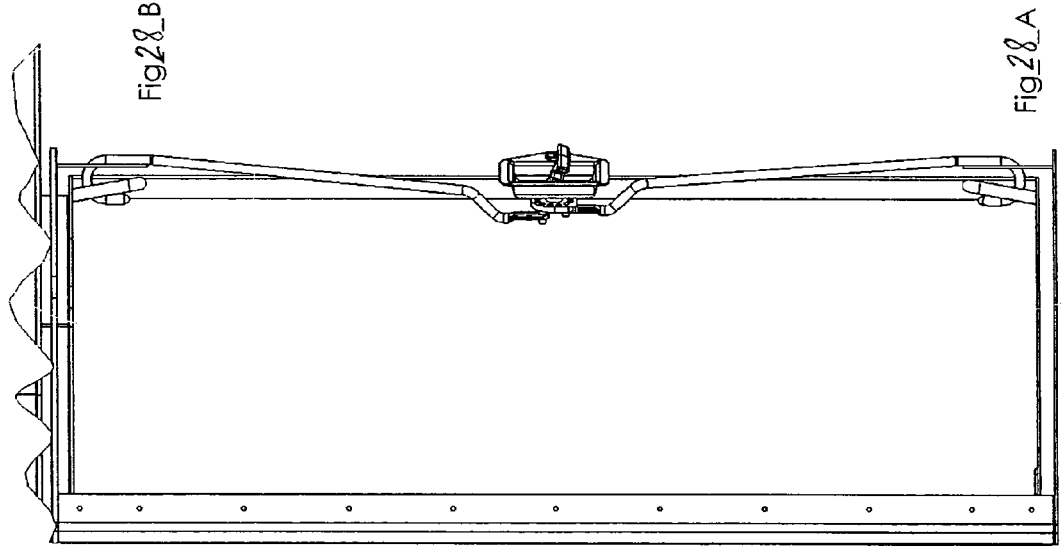
Fig 28

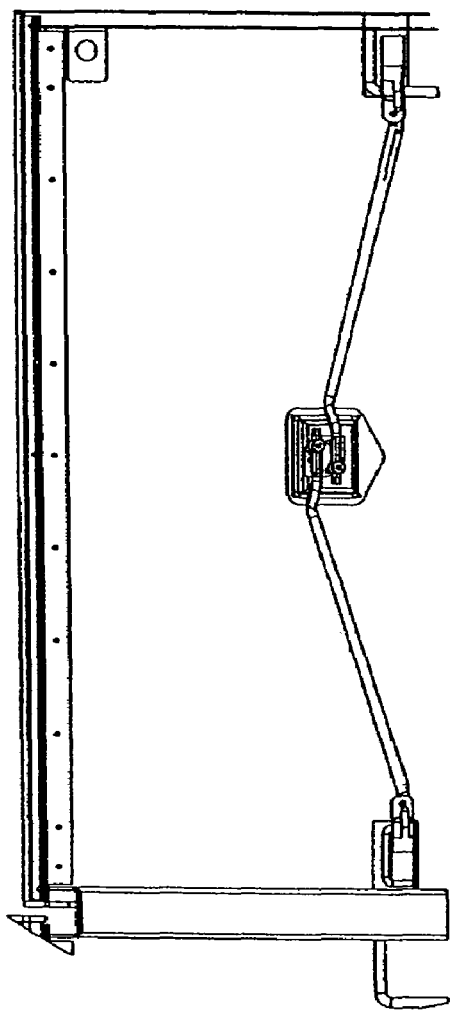
Fig_32
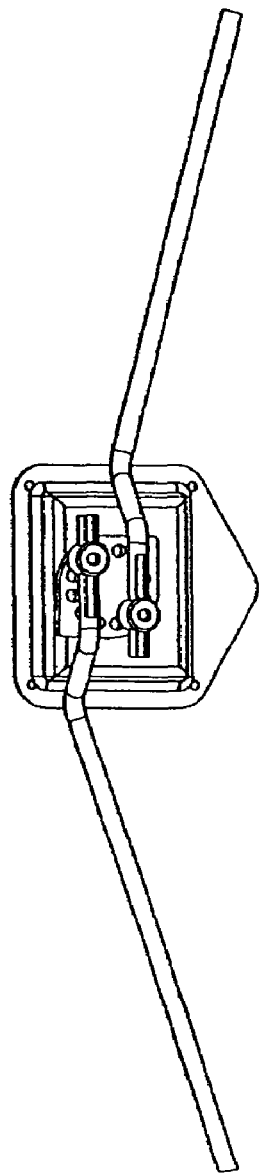
Fig_32_A

TOOLBOX LATCH AND HINGE APPARATUS AND METHOD

CROSS-REFERENCE TO RELATED APPLICATIONS

This application is a continuation-in-part of U.S. patent application Ser. No. 10/959,232 filed on Oct. 6, 2004, which claims priority from U.S. Provisional Patent Application No. 60/508,684 filed Oct. 6, 2003.

BACKGROUND OF THE INVENTION

1. Field of the Invention

This invention relates to pick-up truck accessories, specifically to such accessories which are used for the purpose of mobile storage of tools and/or other items.

The present invention relates to pin-less hinges. Specifically, the present invention relates to moisture tight hinges being used on toolboxes, machinery and/or other devices. This invention also relates to locks. Specifically, the present invention relates to theft protected locks being used on toolboxes, machinery and/or other devices.

2. Related Art

Pick-up truck up-fitters and outfitters and home improvement stores commonly provide consumers with toolboxes which can be mounted into the bed and/or on the railing of a pick-up truck. These toolboxes generally are used to store tools and/or other goods enabling the user to perform his/her job function. That job function may fall into the categories of Trades People, Service, Mill Wrights, Heavy Machinery, Mechanical Maintenance and/or Repair, Hunter, Hobby Enthusiasts or other category in which the user has a need for mobile storage and easy access to those stored objects. These mobile storage units may generically be referred to as utility bodies and/or other high-mount toolboxes.

These traditional storage units open outward and toward the user. Anywhere from four (4) to five (5) inches of useable space is lost. This limits the user to only being able to store smaller hand tools. The storage device limits the size of items placed in the storage device to an item considerably smaller than the storage device. Mounting excessively large, expensive toolboxes is required to meet the needs of the user. Because of the limited space and lost upper storage space due to the outward opening door, a user needing to carry larger hand tools (such as a large circular saw or grinder or hand drill or tool chest) were required to store such items outside of their toolboxes and exposed to weather causing corrosion and damaging these larger hand tools.

Traditional high mount toolboxes open outward. The outward opening infringes upon the user's ability to easily access his/her tools. The user was forced to reach up and over the door causing strain to the user's back. The user must pull his/her tools out onto the door ledge for easier work accessibility. Then, during the job clean-up phase, the user is required to take an additional clean-up step to place tools back into the storage unit; thus, the user loses valuable work time.

The square shape of such current storage units restricts the user's rear-view driving visibility causing potential traffic accidents. The slide-in cargo enclosures further restricts the driver's rear-view visibility.

Water, especially during a hard thunder storm, will seep through hinges in prior art. Tools can be damaged from corrosion.

Other storage units use a cam-action-slam latch or a simple deadbolt which enables dishonest passer-bys to violate the door opening and steal valuable tools inside. The cam-action locks can easily be popped out of their latch pin. The deadbolts can be popped out of their home, locked position.

Originally storage utility bodies were directly mounted onto the frame of the vehicle. This caused holes to be drilled directly into the vehicle, structurally altering the vehicle, and making change-outs unsightly. U.S. Pat. No. 5,845,952 to Albertini (1997) discloses a slide-in storage body which can be placed into the bed of the pick-up without damage to the pick-up; however, this storage unit is one piece. Albertini's invention can not be reconfigured post manufacture.

Bed-liners lose large amounts of usable storage space by failing to capitalize on the space between the rear wheel-wells and potential for utilizing this space not only for storage, but also for stake pockets to double deck the main part of the pick-up bed.

Hinges

Traditional hinges have two symmetrical halves held together with a pin. An example might be a piano hinge or a common house door hinge. A clearance gap exists between the hinge halves in order for the parts to freely rotate.

This traditional design on previous hinges limited usage and adaptability in harsh weather environments. If unprotected, moisture seeps through the joints. Weather stripping is required to protect the hinge being utilized outside. Without this protection, moisture traveling through the hinge will get into the unit and destroy other parts within the article and/or machine.

The only way to weather proof the prior art hinge is to enclose the hinge preventing weather from touching the hinge; thus, creating an additional protective guard part. In U.S. Pat. Ser. No. 6,976,290 B2 Boyer recognizes the need for hinges to provide weather tight service and aesthetic appeal. However, his hidden hinge requires a hinge pin or extraneous piece in order to properly function. This limits the design ability and/or function because provision must be made to protect the hinge from weather elements. The protective guard can cause as much as two (2) to three (3) inches of usable space to be lost. The superfluous weather seal piece might cause increased cost of production. Each additional piece within a design has the potential to cause more warranty failure issues. The weather seal additionally causes an aesthetically displeasing appendage and adds significant weight to the design. Finally, the superfluous protective guard limits the shape of the attached workpiece door opening.

Other pipe-on-pipe hinges such as might be found in a shower stall and/or picture frame function well when placed in a vertically positioned hinge. The vertical position allows gravity to push the moisture down vs. around and into the hinge. However, when used in an outside, and/or moist environment positioning the hinge horizontally would cause capillary action water to run through the hinge and into the enclosure; thus, causing water damage to items stored within the storage unit.

Workers such as trades people, service, mill wrights, heavy machinists, mechanical maintenance workers and/or repair, hunters, hobby enthusiasts or other category of person needing mobile storage often utilize utility bodies, cross-body toolboxes, high-mount toolboxes or other form of mobile storage. These persons regularly open and close the doors to these storage units and these storage units are subject to extreme changes within weather climate.

Due to previous limitations of the hinges used, these traditional storage units open outward toward the user. Anywhere from four (4) to five (5) inches of useable space is lost. This limits the user to only being able to store smaller hand tools. The storage device limits the size of items placed in the storage device to an item considerably small than the storage device. Mounting excessively large, expensive toolboxes is required to meet the needs of the user. Because of the limited space and lost upper storage space due to the outward opening door, a user needing to carry larger hand tools (such as a large circular saw or grinder or hand drill or tool chest) is required to store such items outside of their storage units and exposed to weather causing corrosion and damaging these larger hand tools.

The outward opening further infringes upon the user's ability to easily access his/her tools. The user is forced to reach up and over the door causing strain to the user's back. The user must pull his/her tools out onto the door ledge for easier work accessibility. Then, during the job clean-up phase the user was required to take an additional clean-up step to place tools back into the storage unit; thus, the user loses valuable work time.

U.S. Patent Pending 2005/0145527 A1 to Christensen discloses an upward opening door allowing the user to easily access his/her tools and allowing the weather tight storage of larger hand tools; however, the hinge opening this upward opening door protrudes into the truck bed when open. Full utilization of the storage space within the truck bed or space behind the storage unit can not be capitalized on. Should this storage unit be mounted on a stationary location and/or railing, the toolbox would not be able to be flush with the wall it would more than likely be mounted against. Thus, valuable storage and user space is lost. Additionally, the user is limited in his/her ability to fully utilize the space behind the storage unit and the storage unit itself. He/she must choose to fully utilize the storage unit, but not the space behind it. Or, to fully utilize the space behind the storage unit, but not the storage unit.

Locks

Traditionally, toolboxes are closed with either a dead-bolt locking mechanism, a slam latch, or a rotary cam latch locking mechanism. Depending on which method is chosen, one, two or three points of contact with the given assembly is needed per latch.

A deadbolt lock utilizes a handle which rotates a bolt or rod to extend outwardly from an edge. The bolt or rod is engaged when extended outwardly and fitted into some type of a receiver. When not engaged the bolt or rod moves toward the deadbolt handle.

These deadbolt locks may have one, two, or a plurality of rods that act as the latching mechanism(s). Each bolt or rod makes one point of contact. To increase the resistance to forced entry, the dead-bolt may have three points of contact with the third being at the center of the door. The greater the number of contact points, the greater the security level. When only two points of contact are used, theft easily occurs. The thief pries on the center of the door and the door bends at the center causing the two-point deadbolt to be pulled out of the receiver. Thus, a third point on contact at the center of the door must be used to prevent the middle of the door from popping out. The longer the door/lid, the more important the third point on contact becomes when using a dead-bolt locking mechanism. Generally, a toolbox utilizing a deadbolt needs at least three points of contact to maintain security.

There is a need in the art for a simple locking system with greater security than a comparable traditional two-point deadbolt locking system, and for lower cost than a 3-point deadbolt.

Slam-latches may have one latch assembly at the center of the door. Or, to increase the security of the door/lid two slam-latches per door/lid may be used. The slam-latches generally have a single point of contact at the center of the door. A thief can easily pry the ends of the doors open to break into the box. To insure security on a long door, two slam-latches are necessary which doubles the cost. Slam-latches can get out of adjustment with wear and tear and/or not be properly adjusted. They have multiple moving parts that tend to wear out and require extra maintenance for lubrication and part replacement. Finally, safety is a concern. A user slamming the given workpiece shut but not taking care to insure that other persons standing next to him/her have their fingers out of the given workpiece, can easily damage an onlooker's hand and/or finger(s). The slam-latches tend to not latch. When being used for mobile storage, the user risks the door wiggling open while driving. The open door may cause the user to lose valuable stored items, or worse potentially causing an automobile accident due to objects falling unexpectedly and haphazardly falling into the roadway.

Another latch mechanism is referred to as a rotary, cam latch. The cam latches by rotating and capturing a latch pin such as in car doors. A cam latch generally has one point of contact with the door/lid. To increase security, two points of contact may be used. Like slam-latches, rotary cam latches present a multitude of problems. They can be difficult to adjust. They are complex with many moving parts and are prone to failure. Most rotary latches have a two position latch. In first position the door is shut. In second position the door is shut tightly. If not tightly shut into second position the door can easily become ajar while driving. Movement will breech the weather seal and/or totally open the door or lid. As when using the slam-latch, the user may lose valuable stored items and/or potentially cause an accident if tools fall into the road way.

In the toolbox industry, most deadbolt locks have two deadbolts that are linearly opposed to each other. They act by moving away from each other, or outwardly, with a short pin that engages a receiver. A receiver might be a simple hole or an angle that the rod slips behind. Or, the receiver mechanism might be adjustable.

There is a need in the art:
to create hinged doors on the toolbox sections which open upward to a minimum height above the base of the compartment; to provide an ergonomically correct access; to utilize gas springs hold the doors up out of the way, so both hands can be used to remove or to insert work tools in the compartments so as to create a built-in work station; to allow greater visibility to the rear of the vehicle than previously conceived toolboxes, thus reducing blind spots to the rear of the pickup truck and improving safety and visibility; to provide the consumer with a weather resistant hinge; to utilize a reverse deadbolt; thereby, forbidding theft; to allow the user to mix-and-match brands of top storage unit attached to the bottom storage unit or bed-liner and to provide the user flexibility to mount the storage units directly to the side-rails of the pick-up or to the bed-liner; thereby, providing the consumer with an option to utilize the toolbox storage compartments separately from the bed-liner; to maximize and utilize the storage space above the rear wheel wells; to maximize and utilize the storage space behind the rear wheel wells. to provide a cost efficient, simple design; to provide a latching mechanism with fewer parts than the current 3-point deadbolt but with greater security; to provide a deadbolt latching mechanism which positively engages its receiver or latch pin; to provide a latching mechanism which has two points of contact to its' attached workpiece; to provide a latching mechanism which has two points of contact at the ends of the attached workpiece; to provide a theft resistant locking mechanism; to provide a theft resistant locking mechanism which continues to provide theft resistance when attached to a long workpiece; to provide a secure locking mechanism where the user can feel and see that the door is securely latched. Thus, the user does not have to fear that the door will open will driving down the highway; and to provide a latching mechanism which locks tighter when a thief attempts to pry the door open.

SUMMARY OF THE INVENTION

The present invention is comprised of three sections of storage compartments. The first section of the toolbox system contains a set of compartments for holding a multitude of work tools. There are two separate sections, one on each side of the pickup truck. These sections can be customized with drawers and dividers in order to allow for multiple configurations that hold work tools securely in place. In addition, a reverse deadbolt locking system is utilized in order to insure the doors remain in the closed position until the user wishes to open the compartment and to protect against theft.

The present invention provides rear visibility unachieved by other inventions. Due to all of the compartments being compact and on the sides of the pickup truck bed, the rear window of the pickup truck has minimal obstructions. The trapezoidal shape of the toolbox promotes and allows greater visibility to the rear of the vehicle than previously conceived toolboxes, thus reducing blind spots to the rear of the pickup truck and improving safety and visibility.

The entire structural integrity of this toolbox system allows it to be supported outside of and/or remotely located from that of the pickup truck. The present invention also has the capability to use truck camper jacks to support toolbox system. The truck camper jacks can be attached and detached, allowing the pickup truck to back in and pull out from underneath the toolbox system.

Hinges

The present invention is comprised of two pieces forming a pin-less hinge. One-half of the hinge is 'C' shaped. The second half is generally 'P' shaped with a gap at the top of the 'P'. The 'C' shape will generally pivot on top of the 'P' shaped part. The 'P' shaped half will generally bias itself to remain stationary.

Surface tension in capillary action overcomes gravity. Surface tension and capillary action cause the water to come around the 'C' shape and try to go into the channel within the hinge. Capillary action has the potential to channel water through the hinge and into the box. This capillary action would normally require a rubber seal to stop the water seepage from entering the box. The upper opening on the 'P' shaped part mechanically stops capillary action by providing an alternate path for the moisture to migrate to thereby stopping the capillary action. Once hitting the opening in the 'P' shaped part gravity ensues and the water drops down into the rain channel. The rain channel channels the water out and away from the storage unit.

The generally 'P' shaped half, with the slot at the top, forms an integrated channel. This integrated rain channel eliminates moisture migration due to capillary action forming in between the close fitting hinge halves. Rather than going around the hinge and into the attached workpiece, the gap induces gravity to break surface tension, and any such moisture as would enter the hinge drops into the rain channel. The rain channel then funnels the moisture out.

This configuration allows for the least number of parts to be used to seal against moisture by eliminating pliable weather sealed hinge design. This hinge improves aesthetic value of the workpiece, decreases cost of production and warranty issues. This hinge allows for both horizontal and vertical positioning against the given workpiece. This hinge design does not limit the type of material used to construct the hinge. The hinge could be made out of aluminum, steel, cast material, composite material or a combination of materials.

Locks

The present invention is a reverse deadbolt latching mechanism is essentially two rods which are linearly opposed to each other. Each rod has a hook on the end of it that effectively reverses the direction of the deadbolt. When the deadbolts move out or away from each other, my invention unlocks from its' latch pin. When the rods move toward each other, the reverse deadbolt engages its' latch pin. Thus, should a pry bar be used to try to "pop" the lid, the latch will lock tighter and the toolbox lid surface will not bend at the middle foiling a thief's attempt to steal goods.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 shows a perspective of the toolbox compartments mounted onto a surface, in this case a pick-up truck.

FIG. 5 shows a detail view of a latching mechanism.

FIG. 6 shows a detail view of a hinge mechanism.

FIG. 13 shows the zero clearance hinge attached to a storage unit and mounted onto the railing of a given object.

FIG. 16 shows an isometric view of a toolbox. The first door is in the closed position. The second door is in the open position. The exterior surface is removed from the first door.

FIG. 17 shows detail of the latching mechanism in the closed position with a latch retaining plate and a fixed position latch receiver pin.

FIG. 18 shows detail of the latching mechanism in the closed position and the fixed position latch receiver pin. The latch retaining plate is removed.

FIG. 19 shows a top view of the toolbox. The first door is in the closed position. The second door is in the open position. The exterior surface of the first door is removed.

FIG. 20 shows a top view of the latching mechanism in the closed position with the latch retaining plate and the fixed position latch receiver pin.

FIG. 21 shows a top view of the latching mechanism in the closed position and the fixed position latch receiver pin. The latch retaining plate is removed.

FIG. 22 shows a rear view of the toolbox. The first door is in the closed position. The second door is in the open position. The back and bottom exterior surfaces are removed.

FIG. 23 shows a rear view of the latching mechanism in the closed position with the latch retaining plate and the fixed position latch receiver pin.

FIG. 24 shows a rear view of the latching mechanism in the closed position with the latch retaining plate and the fixed position latch receiver pin.

FIG. 25 shows an isometric view of a toolbox. The first door is in the closed position. The second door is in the open position. The exterior surface is removed from the first door.

FIG. 26 shows detail of the latching mechanism in the open position with the latch retaining plate and the fixed position latch receiver pin.

FIG. 27 shows detail of the latching mechanism in the open position and the latch receiver pin. The latch retaining plate is removed.

FIG. 28 shows a top view of the toolbox. The first door is in the closed position. The second door is in the open position. The exterior surface of the first door is removed.

FIG. 28a shows a top view of the latching mechanism in the open position with the latch retaining plate and the fixed position latch receiver pin.

FIG. 28b shows a top view of the latching mechanism in the open position and the latch receiver pin. The latch retaining plate is removed.

FIG. 29a shows a detail rear view of the latching mechanism in the open position with the latch retaining plate and the fixed position latch receiver pin.

FIG. 29b shows a detail rear view of the latching mechanism in the open position and the fixed position latch receiver pin. The latch retaining plate is removed.

FIG. 32 shows a fabricated sheet metal hook latch mechanism.

DETAILED DESCRIPTION OF THE PREFERRED EMBODIMENTS

The following description of the preferred embodiment(s) is merely exemplary in nature and is in no way intended to limit the invention, its application, or uses.

Figure 1:
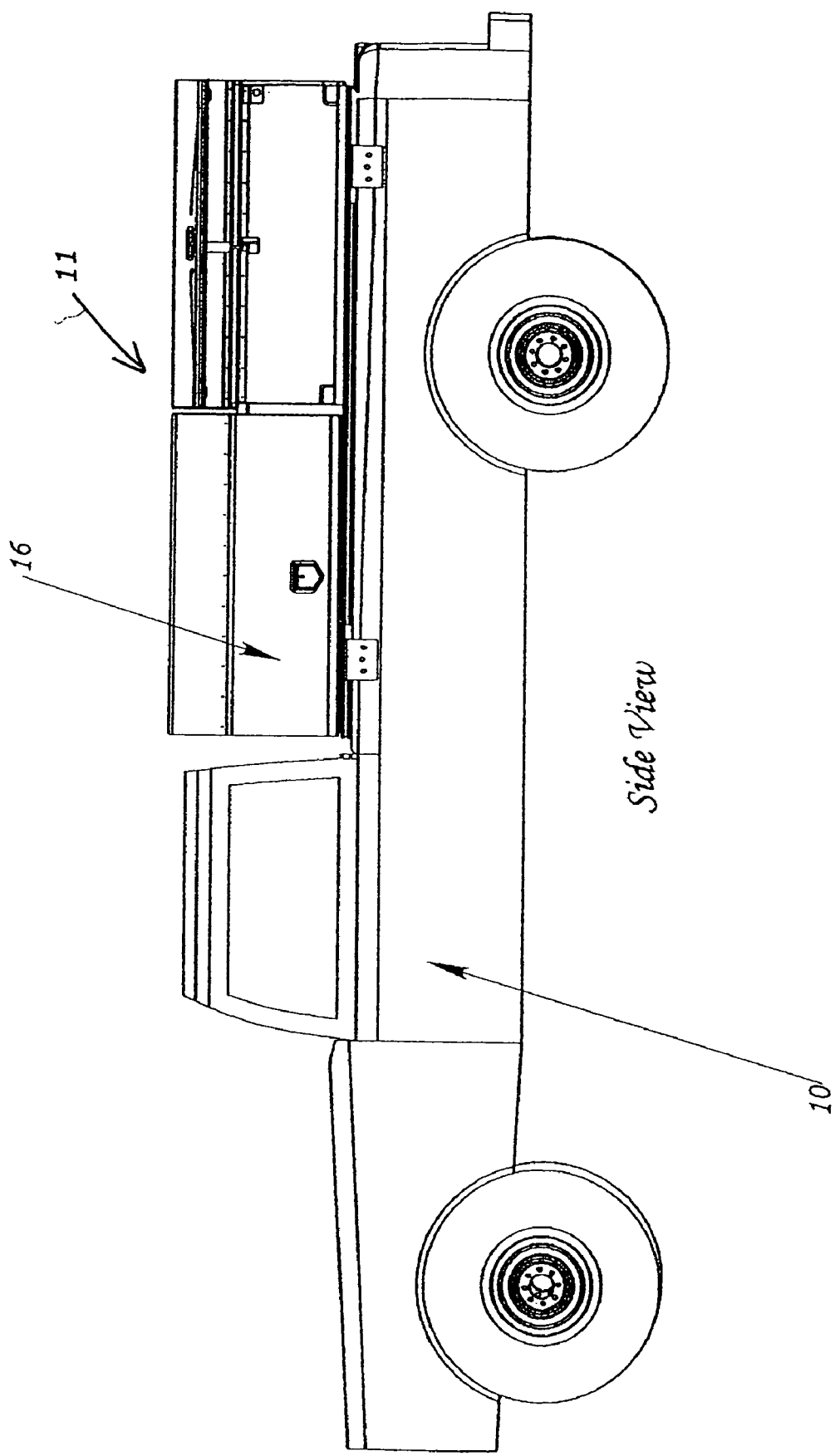
FIG. 1 shows a side view of the combined system with an opened compartment on each section of the toolbox units.
Figure 2:
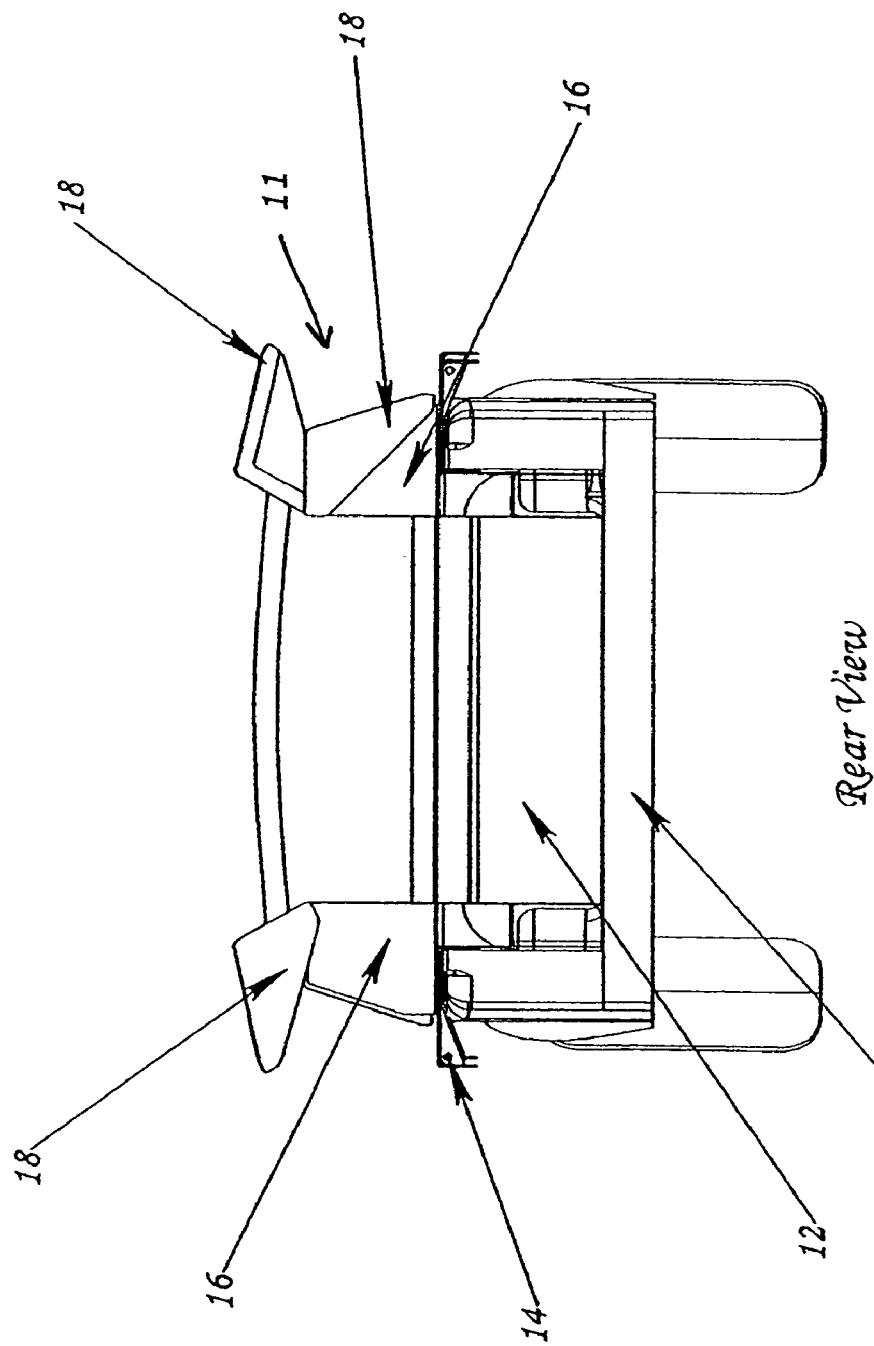
FIG. 2 shows a rear view of the toolbox compartments mounted onto a surface, in this case a pick-up truck.
Figure 3:
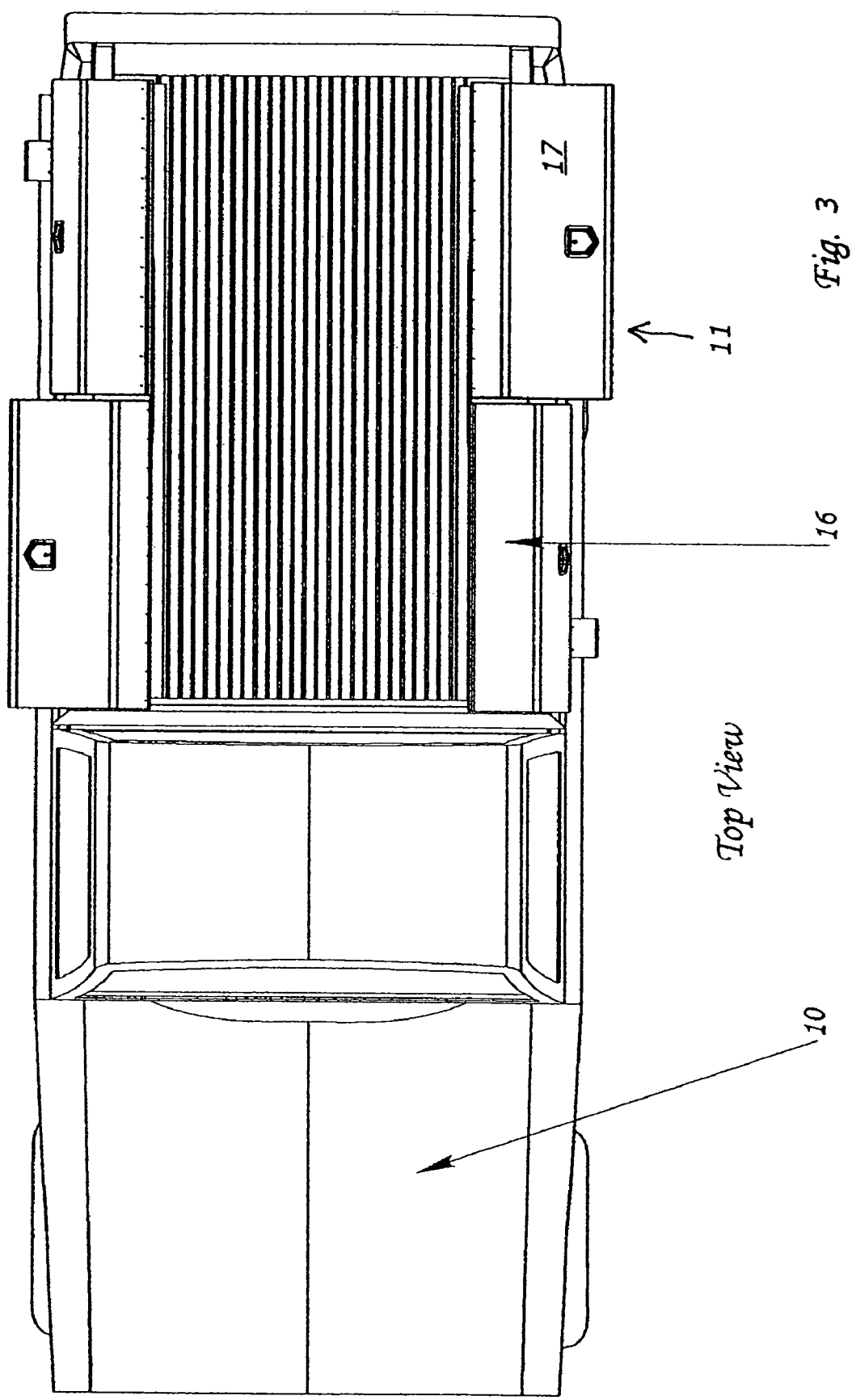
FIG. 3 shows a top view of the bed-liner with toolboxes mounted to the flange of the bed-liner
Figures 7, 8:
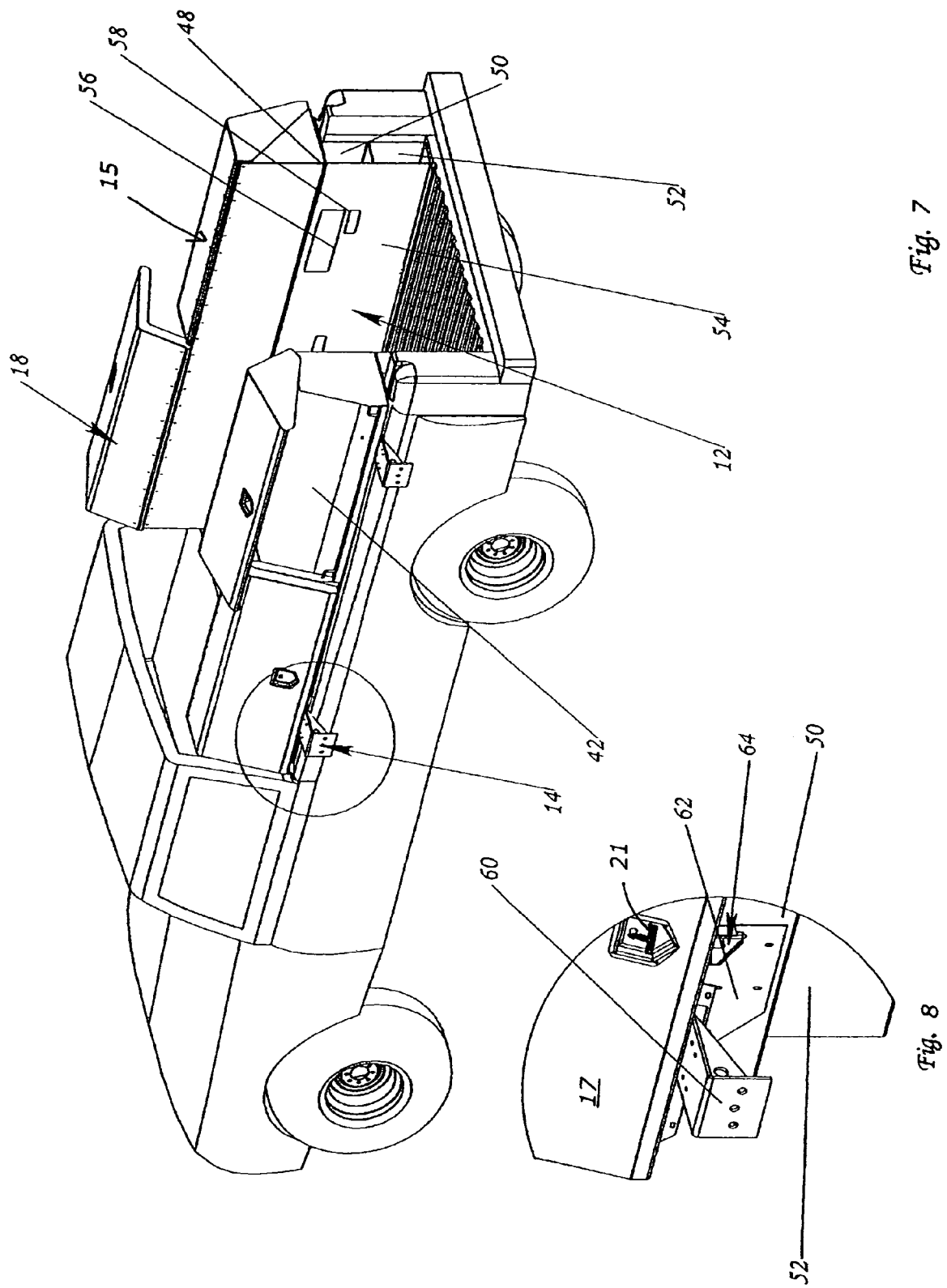
FIG. 7 shows a perspective of the bed liner compartments mounted onto a surface, in this case a pick-up truck.
FIG. 8 shows a detail view of the jack mount mechanism.

A Combination Bed-Liner and Toolbox system 11 for use with a Pick-up Truck is illustrated in FIG. 1 (side view), FIG. 2 (rear view), FIG. 3 (top view) FIG. 4 (perspective view), FIG. 5 (detail view), FIG. 6 (detail view), FIG. 7 (perspective view), FIG. 8 (detail view). The bed-liner and toolbox includes a toolbox assembly 16 and a bed-liner 12. In the depicted embodiments, the bed-liner and toolbox 11 has two toolbox assemblies 16. The toolbox assembly 16 is attached to the bed-liner 12. As can be seen in FIGS. 2, 4, and 7, the Combination Bed-Liner and Toolbox system 11 may include jack mount support assembly 14. As best seen in FIG. 8, the jack mount support assembly 14 is attached to a bed liner middle rail 50.

FIG. 1 shows a side view of the Bed Liner and Toolbox 11 as it might appear mounted in a commercial pickup truck 10. FIG. 2 shows a rear view of the bed liner and toolbox 11 as it might appear mounted in a commercial pickup truck 10. FIG. 3 shows a top view of the bed liner and toolbox 11 as it might appear mounted in a commercial pickup truck 10. FIG. 4 shows a perspective of the bed liner assembly 12 and the toolbox assembly 16 as it might appear mounted in a commercial pickup truck 10. Toolbox assembly 16 includes toolbox base 42, also termed the box section, backbone, main channel, or support 42. The toolbox base 42 is connected to the toolbox base end 40, also termed the end panel or box end, by welding or another appropriate attachment method such as rivets, bolts or other loose hardware or by adhesive, glue or other attaching methods. The toolbox base 42 is connected to the water channel 22, also termed the center rib, rain channel, mid rib, or divider by welding or another appropriate attachment method such as rivets, bolts or other loose hardware or by adhesive, glue or other attaching method. The toolbox base has a bottom and a back extending vertically from the bottom.

The lid plate 26, also termed the lid, door panel, top, or wing, is connected to the end lid end 28 also termed the lid end panel and the middle lid end 24, also termed lid end mid, lid mid panel by welding or another appropriate attachment method such as rivets, bolts or other loose hardware or by adhesive, glue or other currently available attaching method.

FIG. 7 shows a perspective view of the combination bed liner and toolbox system 11 as it might appear mounted in a commercial pickup truck 10. The bed liner assembly 12 includes a plurality of sub components. The bed liner side 54, also termed sidewall, riser, wall, or side rail extends the length of the pickup bed and rises above the floor approximately equal to the top of the pickup truck bed rail. The bed liner side 54 attaches to the bulkhead at the front of the bed liner with weld or a plurality of loose fasteners such as rivets, screws or bolts. Additionally, the bed liner side 54 attaches to the bed liner middle rail 5, also termed the mid rail, middle channel, running the length of the bed liner 12 with weld or a plurality of loose fasteners such as rivet, screws or bolts. The bed liner side 54 attaches to the rear quarter rail 52 with weld or a plurality of loose fasteners such as rivets, screws or bolts. FIG. 7 also illustrates a jacking bracket 60 and a jacking bracket receiver 62. The jacking bracket 60 and the jacking bracket receiver 62 are part of the jack mount support assembly 14. The jack mount support assembly 14 also includes a clamp 64.

The bed liner side 54 contains a plurality of cutouts, holes, openings 56, 58 into which numerous object or devices can be inserted. The large cut out 56 opens into the longitudinal void created by the rear quarter rail 54 and the middle rail 50. This void extends the length of the pickup truck bed and is rectangular in shape. The small cut out 58 opens into the longitudinal void created by the bed liner side 54 and the middle rail 52. This void extends the length of the pickup truck bed and is rectangular in shape.

The present invention is comprised of three sections of storage compartments. The first and second sections 16 of the combination bed liner and toolbox system 11 contains a set of compartments for holding work tools. There are two separate sections 16, one on each side of the pick-up truck. These sections can be customized with drawers, dividers, shelves, or some combination thereof. The third section 12 comprises a support structure and integral storage structure containing storage compartments primarily for the storage and transport of work tools.

The Combination Bed-Liner and Toolbox for Pick-up Truck 11 system is adapted to reside in the bed of a pickup truck or attached to a trailer in order to allow the bed of the pickup truck to be used for carrying additional cargo.

The first and second sections 16 are essentially trapezoidal, with the angled, non-perpendicular portion of the trapezoid approximating the angle of the pick-up cab sidewall B-post (generally between 95 degrees and 115 degrees). The front and top faces of the section comprise the door opening. The general dimensions of the section are approximately twelve inches at the base and eight inches at the top, and approximately fourteen inches high, but could be taller or shorter based on desires and needs for the compartments. The length of the compartments would be dependent upon the dimensions of the particular pickup truck the toolbox system was installed in or the desires of the retail purchaser. The compartments are comprised of a rigid material such as diamond tread aluminum, but could be various grades of steel, aluminum, stainless steel, or various composite materials such as fiberglass or plastic. The door opens approximately equal to the top of the sidewall and the depth of the box.

The third section 12 of the toolbox and bed liner system 11 is the section that rests on the bed of the pickup truck and extends upward above the wheel wells of the truck bed and continues upward, stopping approximately flush with the top of the side of the truck bed. The sections above both wheel wells utilize space that is wasted with most toolbox systems. These sections can be used for additional storage of long, narrow items. The size of these spaces is approximately five 5 inches wide eight (8) inches tall and ninety-six 50 inches long. Drawers are also available for placement in this section directly behind the pickup truck wheel wells. The drawers open rearward, extending over the tailgate. The second section area behind the wheel wells, also has the capability for a slide-out vise or clamping tool to be attached and stored. This section is comprised of a rigid material such as diamond tread aluminum, but could be various grades of steel, aluminum, stainless steel, or various composite materials such as fiberglass or plastic.

The third section 12 of the system 11 also acts as a protective lining or bed liner. The protective lining for the bed of the pickup slides in and out similarly to the way a truck camper body would. The lining is comprised of a rigid material that is able to support the weight of the toolbox system and the work tools being stored there in. The lining of the toolbox system approximates the interior dimensions of the pickup truck bed, maintaining a space approximately four feet wide by eight feet long. This section is comprised of a rigid material such as diamond tread aluminum, but could be various grades of steel, aluminum, stainless steel, or various composite materials.

The first, second, and third sections of the system 11 are fastened together using floating fasteners. This allows the tool compartments to be temporarily removed, if more space is needed for larger items, but still allows the protective liner to remain in place to prevent scratches to the truck bed and sides.

FIG. 5 shows a detail view of one latching mechanism. The latch assembly 20 is attached to the lid assembly 18 with loose hardware such as bolts, screws and or rivets. The latch assembly 20 is attached to lid latch rod, also termed the latch rod, dead bolt, slide rod, or hook on the latch assembly 20 end with loose hardware such as a cotter pin, bolt or other fastener. The lid latch rod 32 connects to the base latch rod 30 freely by hooking around, behind or through a void or opening created by the base latch rod 30, the base end 40 and the toolbox base 42. The latching action is accomplished by the rotating a T-handle 21 of the latch assembly 20 there by rotating a cam connected to the base latch rod 30 and pulling the hooked end of the lid latch rod 32 around and behind the base latch rod 30. FIG. 5 also illustrates an actuator 34 connected to an actuator mounting bracket 44. The actuator mounting bracket 44 is connected to the toolbox base 42. FIG. 5 further illustrates a corner gusset 46 connected to the toolbox base 42.

FIG. 5 shows a detail view of a latching mechanism for a toolbox assembly 16 of the present invention. The latch assembly 20 actuates the lid latch rod 32 moving it bi-directionally along the lid assembly. The lid latch rod 32 has a straight flat surface on one end and a hook on the opposing end. The hooked end is oriented approximately perpendicular to the straight flat end. The straight flattened end of the lid latch rod 32 attaches to the latch assembly 20 with a Pin or other loose fastener. The cam on the latch assembly 20 rotates clockwise or counter clockwise causing the lid latch rod 32 to slide in or out toward the ends of the lid. The outward movement of the lid latch rod 32 is a dead bolt action. A dead bolt action is generally accepted as a very secure latching method. The hook on the latch rod allows the dead bolt action to be accomplished in reverse when the latch rod is drawn in toward the center of the box opposite the generally accepted dead bolt action. The reverse deadbolt action draws the hooked end of the latch rod around the toolbox base latch rod 30 securing the lid assembly 18 on the toolbox assembly 16. The base latch rod 30 is secured to the toolbox base 42 through a hole in the toolbox base 42 and by loose fasteners or welding. Further details of the latch are described below.

FIG. 6 shows a detail view of one hinge assembly. The lid assembly 18 is hinged to the toolbox base 42 by a two piece hinge 36, 38. The lid assembly 18 is connected to the upper hinge half 36 with loose hardware such as bolts, screws and or rivets. Additionally the joint between the lid assembly 18 and the upper hinge half 36 is weather proofed to resist moisture migration with structural adhesive sealant. The upper hinge half 36 is attached to the lower hinge half 38, by sliding over the P profile 38. The upper hinge half 36 is secured to the lower hinge half 38 to prevent longitudinal movement by the end lid end 28 and the middle lid end 24. Axial movement is maintained between the upper hinge half 36 and the lower hinge half 38. The lower hinge half 38 is attached to the toolbox base 42 with loose hardware such as bolts, screws and or rivets. Additionally the joint between the lower hinge half 38 and the toolbox base 42 is weather proofed to resist moisture migration with structural adhesive sealant. The lid assembly 18 has a top surface 15 and a front surface 17. The top surface 15 is located opposite the bottom of the base 42 when the lid assembly 18 is in the closed position. The top surface 15 and the front surface 17 form an angle between ninety-five and one hundred fifteen degrees.

FIG. 6 shows detailed view of the hinge assembly for the toolbox assembly 16. The upper hinge half 36 attaches to the lid plate 26 with loose fasteners and adhesive sealant. The lower hinge half 38 attaches to the toolbox base 42 with loose fasteners and adhesive sealant. The upper hinge half 36 is roughly a "C" shape or a crescent shape. The lower hinge half 38 is generally a "P" shape having a circular portion with a leg with the exception that there is an opening in the top of the P where by water is channeled out of the hinge. Relatively tight tolerances on the upper hinge half 36 and the lower hinge half 38 provide a snug fit between the two hinge halves. The snug fit discouraged water migration into the hinge and toolbox. The opening in the P shaped lower hinge half 38 mitigates water migration. The C shaped upper hinge 36 fits around the P shaped lower hinge much like a pipe might slide inside another pipe. A pipe on pipe design provides a secure, wear resistant hinge. The present hinge design allows for ninety plus degrees of movement. The shape of the lower hinge 38 moves the hinge point out ward so that the opening of the toolbox lid does not protrude beyond the vertical back wall of the toolbox. As can be seen in FIG. 6, the upper hinge half 36 and the lower hinge half 38 are concentric. Further details of the hinge are described below.

Shelves might be added to the insides of the toolboxes in various configurations so as to allow the user better organization and, thus, better work efficiency. Hooks and/or other apparatus might also be added in order to better organize and store the user's objects. For example, a hunter might place a gun rack inside the toolboxes.

Various uses in addition to tool storage may be achieved by varying configurations of the system in part or in whole. For example, the bed liner and toolbox assembly could be fitted to a small trailer for use as a tool trailer there by allowing the pickup truck to haul other items and the toolboxes still serve to carry and store tools and other items. Another example might be, the toolbox bodies could be clamped onto a small utility vehicle for use in carrying and storing weapons and/or other munitions for hunting and/or military purposes. For this purpose, the toolbox bodies might be clamped to the vehicle ninety degrees from that shown in FIG. 2 and such that the door openings provided a movable shield for the user.

The present invention has a door opening with the hinge point that is essentially diagonal to the latch point thereby creating a box with essentially two sides that open allowing door opening dimensions that exceed any single face side dimension. Hinged doors open upward to an approximate height of twenty-two inches or greater above the base of the compartment. This clearance height allows for easy access to all of the work tools being stored.

The high mount toolbox design incorporating a trapezoidal shape with one face that approximates the angle of the cab side wall, but can vary in angle from slightly less than the cab angle to vertical creating a box shape that is essentially trapezoidal but allows for essentially a square or rectangular shape. But, that the trapezoidal shape creates an aesthetically pleasing look.

The shape additionally serves a safety purpose. The present invention provides superior rear visibility. Due to all of the compartments being compact and on the sides of the pickup truck bed, the rear window of the pickup truck has minimal obstructions. The trapezoidal shape of the toolbox promotes and allows greater visibility to the rear of the vehicle than previously conceived toolboxes, thus reducing blind spots to the rear of the pickup truck and improving safety and visibility.

The utility box incorporates a weather resistant hinge. The hinge being of a pipe on pipe design that incorporates a method for expelling or channeling water seepage out of the hinge and/or out of the box interior. The hinge design is essentially two pieces of material that interlock by sliding together one over the other. The hinge is attached to the supporting box components in a fashion that allows the hinge to become a structural component adding significant strength and stiffness to the structure and sheet metal parts but is attached in such a fashion that the hinge and/or structural/sheet metal components are easily replaceable or repairable while maintaining resistance to moisture penetration.

The design incorporates common latching and locking hardware and the unique deadbolt system in which the deadbolts operate in reverse of what is thought to be standard deadbolt operation and incorporate to compress the weather stripping and door seal when properly engaged.

The toolboxes can be clamped onto any mobile or stationary surface enabling the unit to serve as a storage device on multiple kinds of vehicles and/or machinery.

A support structure that is essentially the same size and dimensions as the interior of commercially produced pickup truck box with variances allowed for dimensional differences between manufacturers. The support structure, hereafter call bed liner, is designed in such a way that it protects the original bed from damage while improving the efficiency of the usable space in the pickup bed. The bed liner may be constructed of metal, composite material or other suitable material that can support itself in a ridged or near ridged shape.

The bed-liner incorporates stake pockets such that cross members can be inserted horizontally into the stake pockets and when use in conjunction with a piece of plywood or other ridged material create a second level or deck in the bed liner thereby allowing the end user to segregate one kind of material from another or allow the bed liner to be subdivided into two or more compartments for the purpose of controlling cargo movement.

The trapezoidal shape and upward opening doors provide capacity and ease of access. This ease of access allows the user greater efficiency and organization of tools of other stored pieces in that it permits an upward opening door allowing the user easier access to his/her stored items and to capitalize on all the usable space within the box. It further permits driver visibility, prevents water entry corroding expensive stored items, prevents theft of expensive stored items, permits easy vehicle change-outs and reconfiguration of objects to permit user flexibility and need specific utility and permits maximum usage of the pick-up bed and even more advantageous the rear wheel well space.

Hinges

Figure 9:
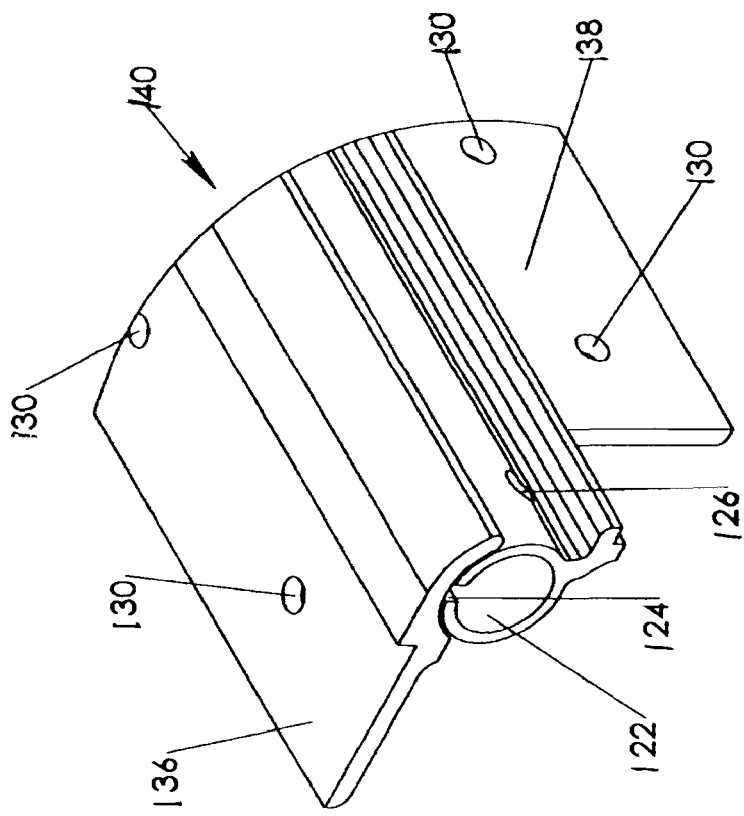
FIG. 9 shows an isometric view of the two hinge halves fitted together.

One embodiment of the hinge is illustrated in FIG. 9. The two hinge halves 136, 138 assemble together. The upper hinge half 136 consists of essentially a semi-circular piece 148 having a 'C' profile. The upper hinge half 136 consists of a tubular piece 148 with open ends. Extension 146 together with the shoulder formed where it meets tubular piece 148 comprise a mount for a lid, which may be attached by screws through holes 130. The tube has a slot running the length of the tube that opens between 90 and 115 degrees. Opposite this longitudinal opening, a flange 139 extends along the length of the lower hinge half 138. The flange is positioned such that the rotation of the upper hinge half 136 with respect to the lower hinge half 138 is stopped. The upper half 136 may be stopped at an angle that will be held open by positioning of the center of gravity of the upper half 136 and lid. Alternatively, the upper half 136 may be stopped in a position that keeps it clear of the truck bed when open. The lower hinge half 138 includes a tubular shaped section 152. The lower hinge half 138 acts as the pivot pin for the upper hinge half 136. When assembled, the tube portion 152 of the lower hinge half 138 and the tube portion 148 of the upper hinge half 136 are substantially concentric in the depicted embodiment. The tube portion 152 of the lower hinge half 136 has a slot 124 running the length of the tube with an opening that is wide enough to stop the flow of capillary water around the engagement between the inside of tube 148 and the outside of tube 152. This slot 124 opens to the rain channel 122. Additionally, the tube portion 152 of the lower hinge half 138 has one or more weep holes 126 located on the lower portion of the tube 152 such that any accumulated moisture in the rain channel 122 can weep out of the hinge tube.

The joint between the lid assembly 118 and the upper hinge half 136 may be weather proofed to resist moisture migration with structural adhesive or sealant.

FIG. 13 shows an end view of the hinge mounted onto a surface, in this case a toolbox. Axial movement is limited between the upper hinge half 136 and the lower hinge 138 by the lid end 148 and the middle lid end 154. The joint between the lower hinge half 138 and the toolbox base 142 may be weather proofed to resist moisture migration with structural adhesive or sealant. The lid assembly 118 has a top surface 115 and a front surface 117. The top surface 115 is located opposite the bottom of the base 142 when the lid assembly 118 is in the closed position. When open and attached to the top surface 115 and the front surface 117 the hinge opens to form an angle between ninety-five and one hundred-eighty degrees.

Figure 10:
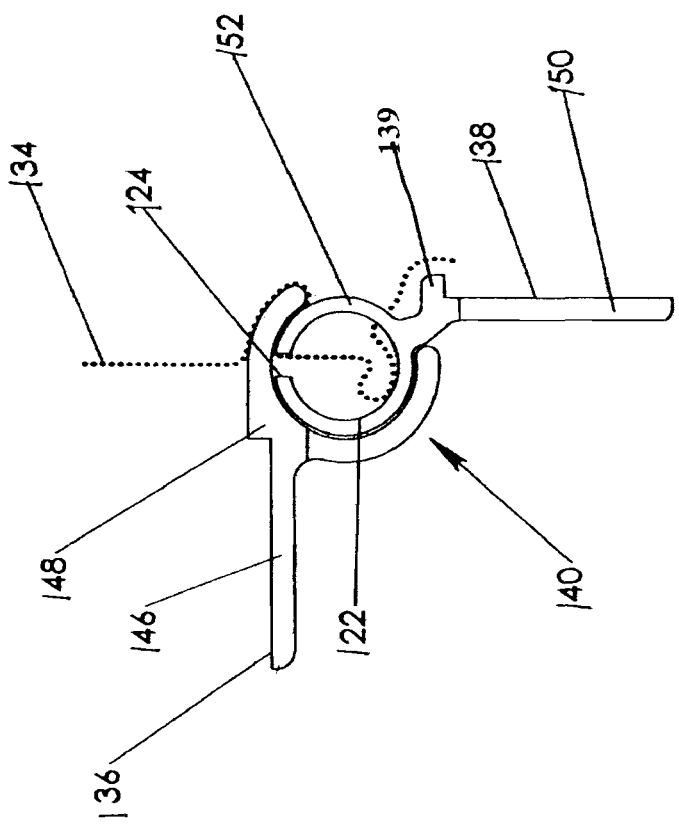
FIG. 10 shows an end profile view of the hinge assembly and demonstrates the moisture path from outside weather elements.

FIG. 10 demonstrates the rain path 134 through the rain channel 122.

FIG. 9 shows a perspective view. The upper hinge half 136 essentially forms a roof over the P shaped lower piece 136 so that water can not run in the crack between the hinge halves.

Figure 12:
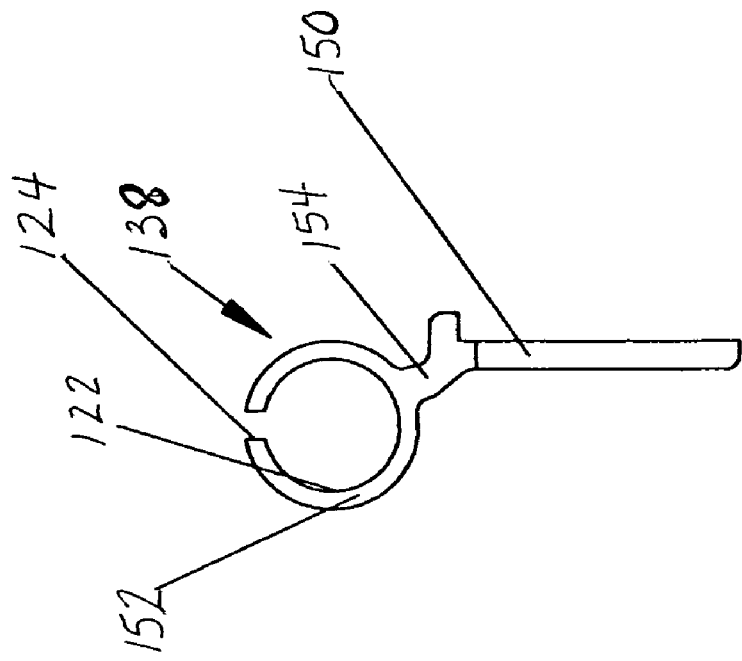
FIG. 12 shows an end view of the lower hinge half.
Figure 11:
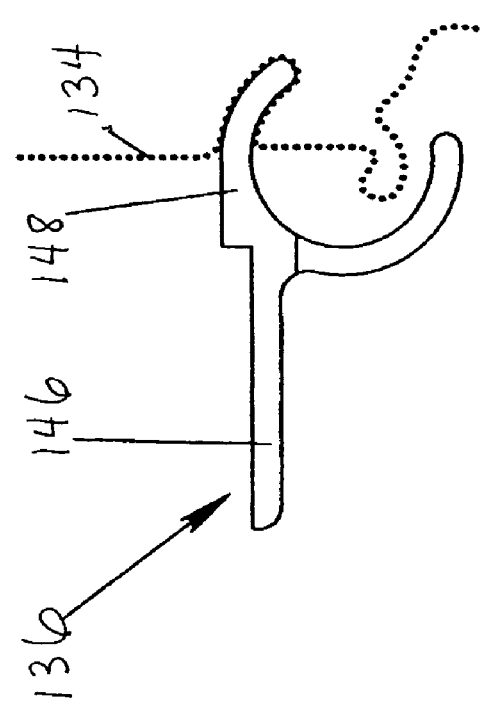
FIG. 11 shows an end view of the upper half of the hinge and demonstrates the moisture path from outside weather elements.

FIGS. 11 and 12 comprise an exploded view of the two hinge sections disassembled. As can be seen in FIG. 12, the lower part or back of the toolbox can be mounted on extension 150 with screws through holes 130 (see FIG. 9). Extension 150 is connected to flange 139 and tube 152 by neck 154. As can be seen on FIGS. 10 and 11, moisture is channeled away from the interior of the toolbox and to the outside along path 134. Path 134 proceeds along the top portion 136. Water may enter the hinge assembly through capillary action beneath the top portion 136 and between an inner aspect of that top portion and an outer aspect of tube portion 152 of the lower hinge portion 138. Capillary action will draw the moisture inwards, counterclockwise as depicted in FIG. 10, until it reaches slot 124. Thereafter the moisture will enter the rain channel 122 where it can run along the length of rain channel 122. Ultimately, the fluid will escape rain channel 122 through weep holes 126 which are placed periodically along the lower portion of tubular portion 152. The weep holes 126 direct moisture outwards, away from the toolbox and over flange 139.

Locks

Figure 14:
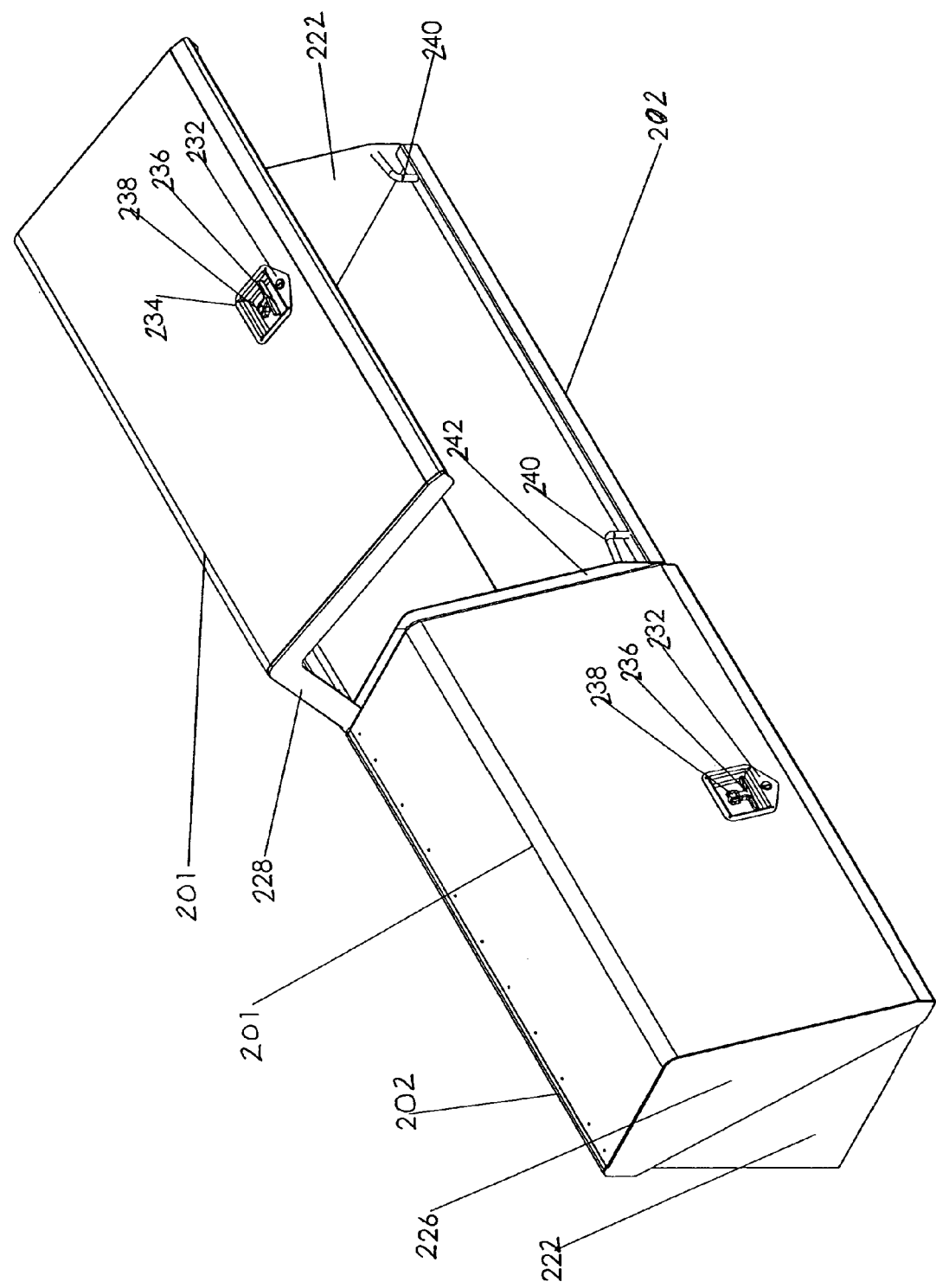
FIG. 14 shows an isometric view of a toolbox. The first door is in the closed position. The second door is in the open position.

An embodiment of the reverse deadbolt lock is illustrated in FIG. 14. FIG. 14 shows an isometric view of a toolbox. The T-Handle Locking Mechanism 232 comprising the T-Handle Cam 238, the T-Handle 236, and the T-Handle Face Plate 234 is visible on the front of the toolbox lid assembly.

Figure 15A:
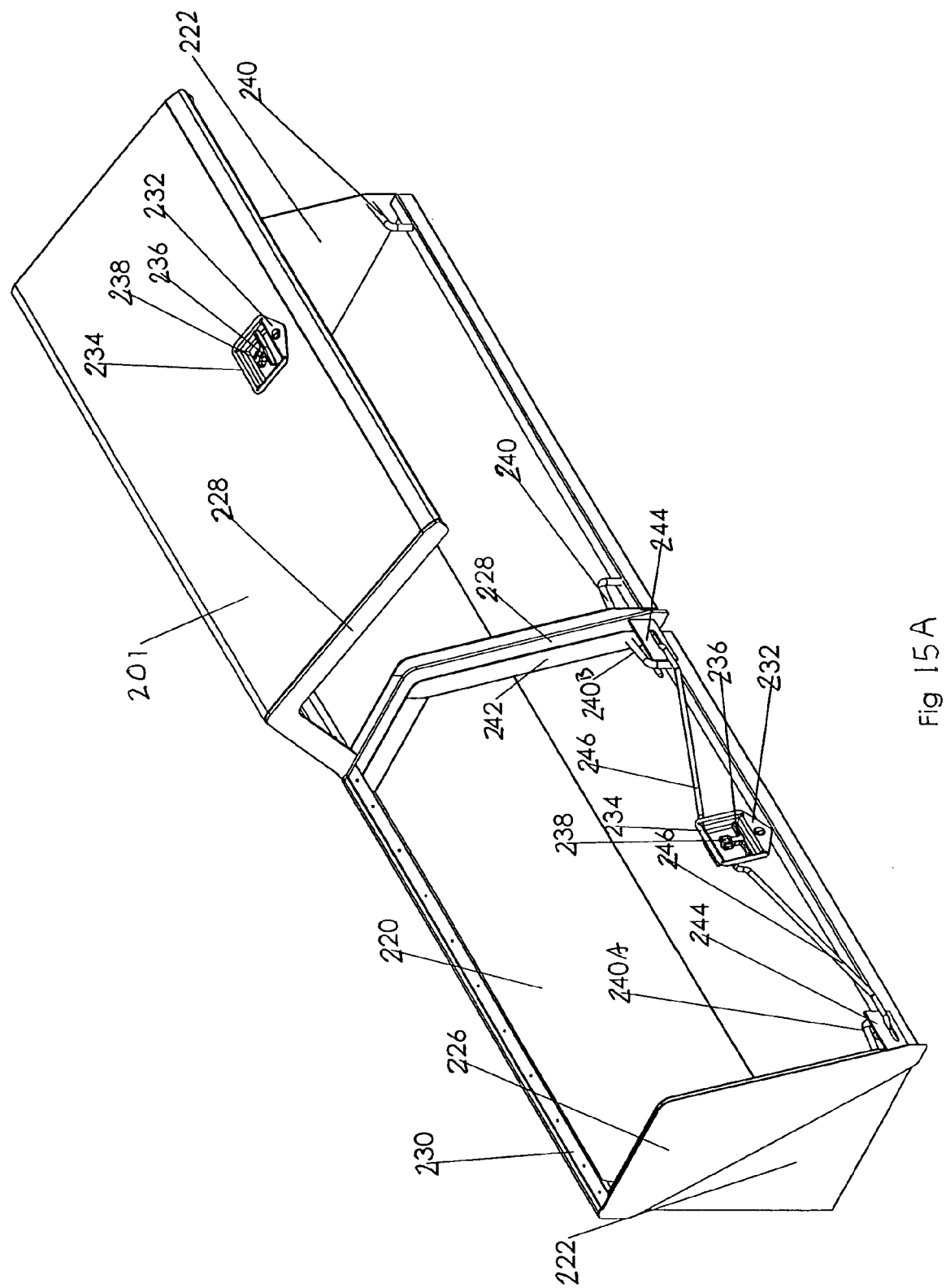
FIG. 15A shows an isometric view of one toolbox. The first door is in the closed position. The second door is in the open position. The exterior surface is removed from the first door.
Figure 15B:
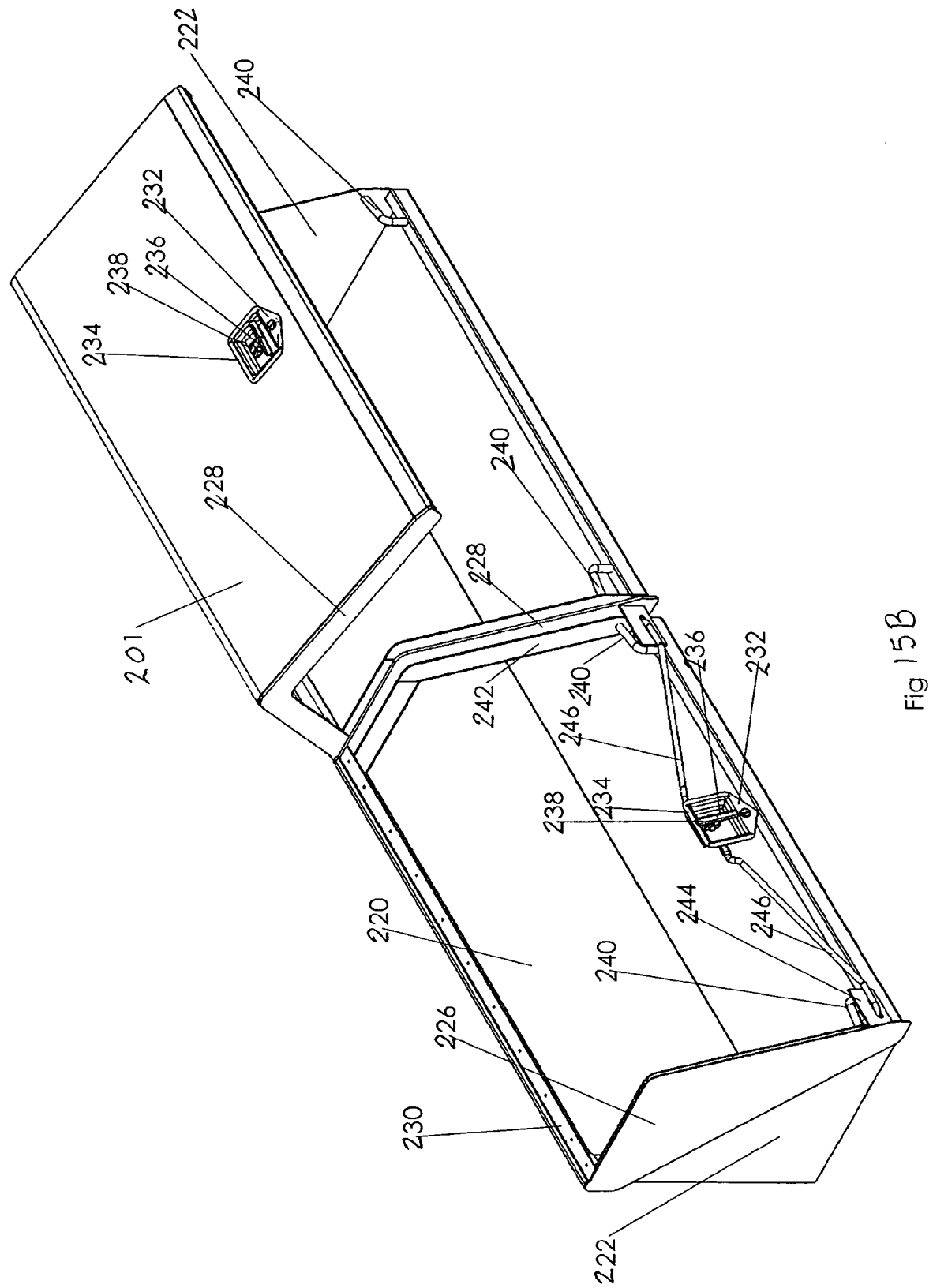
FIG. 15B shows an isometric view of another toolbox with an alternate handle.

FIGS. 15A and 15B shows an isometric view of a toolbox with the toolbox lid exterior surface removed from the toolbox lid assembly for visibility purposes. The toolbox lid assembly is closed and the reverse deadbolt locking mechanism 252 is engaged. In FIG. 15A the T-handle 236 is attached to the T-Handle Face Plate 234. The T-handle 236 is turned such that the top of the "T" is horizontal to and facing the bottom of the toolbox. The latch rod mechanism 246 is attached to the T-handle face plate 234 (best seen in FIG. 32). The latch rod mechanism 46 is inserted through the retainer plate 244. The retainer plate 244 is affixed to the respective toolbox lid assembly at 226 or 242. The latch rod mechanism 246 latches to the receiver pins 240 when engaged. The receiver pin 240A is attached to the front edge of the backbone end 222. Another receiver pin 240B is attached to the toolbox middle channel 242 at the front and bottom edge of middle channel 242.

In operation, when closed the T-handle 236 is horizontal and parallel to the bottom of the T-handle face plate 234. When opening the latch mechanism, the user unlocks the T-handle cam 238 with the appropriate key. Once unlocked, the user lifts the T-handle 236 out and up. The user then turns the T-handle 236 clockwise until the T-handle 236 is vertical (see FIG. 15B). This action releases the latch rod mechanisms 246 from the receiver pins 240. The latch rod mechanism 246 moves in a straight line through the retainer plate 244 with the end hook 250 preventing the latch rod from falling out of the retainer plate 244. The user then opens the toolbox lid. The end hook 250 moves outwardly, away from the central latch. When the hook 250 is clear of pin 240, the lid may be opened.

When closing the toolbox, the user engages the reverse deadbolt locking mechanism by pulling the respective toolbox lid toward the user and down toward the ground to close it. The T-handle is turned vertically. Once the toolbox lid assembly is flush with the toolbox backbone 220, the user turns the T-handle 236 counterclockwise (as depicted) from its vertical position to a horizontal position and parallel to the toolbox backbone 220. Turning the T-handle 236 in this counter clock-wise motion engages the end hooks 250 of the latch rod 246 with the receiver pins 240.

Figure 29:
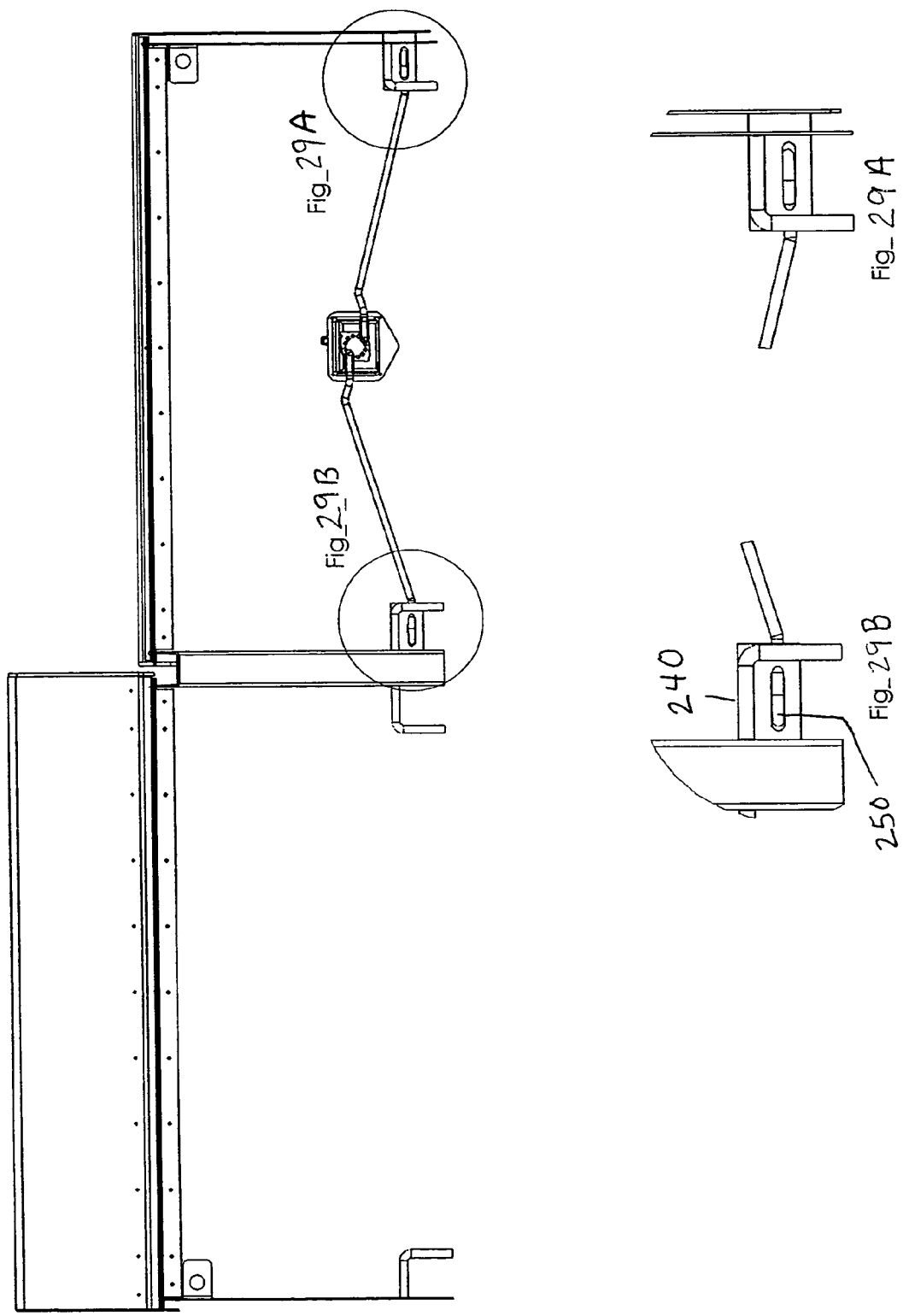
FIG. 29 shows a rear view of the toolbox. The first door is in the closed position. The second door is in the open position. The back and bottom exterior surfaces are removed.
Figures 30, 31:
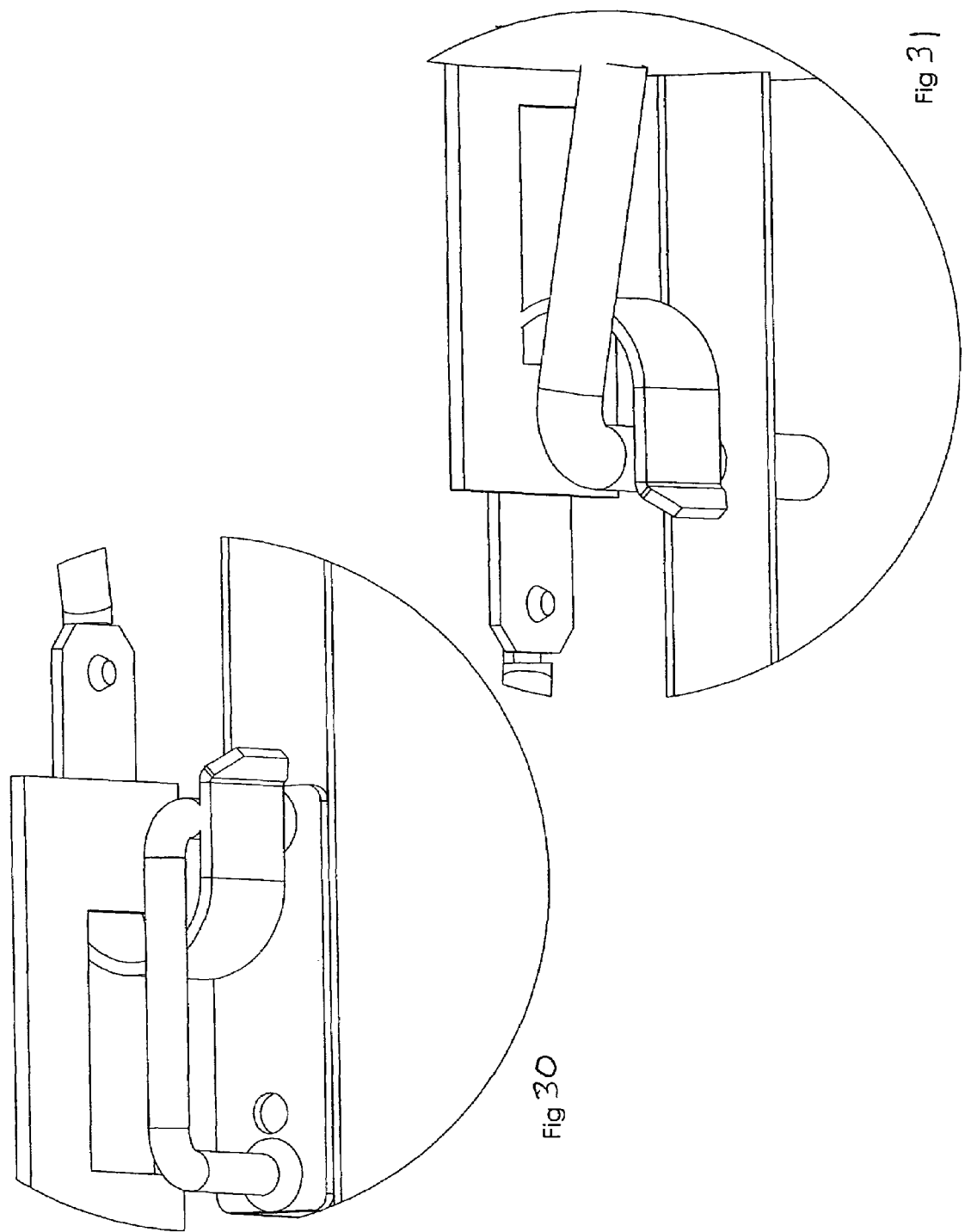
FIG. 30 shows an adjustable receiver pin.
FIG. 31 shows an adjustable latching mechanism.

FIGS. 28 and 29 show the latch in the open position. As depicted, the end of the hook 250 of the retaining rod 246 is now clear of the retaining pins 240 so that when the toolbox lid is open the hooks 250 may be pulled out of engagement with the pins 240.

As can be appreciated from the figures, any attempt to break into the toolbox by forcibly turning the T-handle 236, by prying the lid upwards or by prying the latch rods 246 will have the effect of drawing the hooks 250 inwards and into further locking engagement of the hooks 250 with the pins 240. Accordingly, security is enhanced.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A tool box hinge for a tool box mountable on a pickup truck, said tool box hinge comprising:
a tube, said tube having:
a longitudinal rain channel running axially within said tube;
a longitudinal slot sufficient to establish fluid communication between said rain channel and outside of said tube;
a mount for one of a tool box or a lid;
a weep hole in a side wall of said tube;
a semicircular element extending substantially the length of the tube, said semicircular element being dimensioned to closely cooperate with said tube and said semicircular element being assembled with said tube such that said tube may rotate around its axis within said semicircular element;
said semicircular element being disposed to cover said slot throughout said rotation;
said semicircular element having a longitudinal opening between substantially about 90 degrees and substantially about 115 degrees;
said tube and said semicircular element being constructed and arranged such that said mount for a lid of said tube extends through said longitudinal opening in said semicircular element;

said semicircular element having a mount for the other of a tool box or a lid;

said slot in said tube being sufficient to divert any capillary action of fluid between an inner surface of said semicircular portion and said outer surface of said tube;

said tube, semicircular element, slot and weep hole being disposed such that fluid contacting said hinge and entering said assembly of said tube in said semicircular element proceeds no farther between said tube and said semicircular element than said slot, the fluid further entering said rain channel through said slot and exiting said rain channel through said weep hole;

said tube and said semicircular element being constructed and arranged such that fluid enters said rain channel through said slot and between said inner surface of said semicircular portion and said outer surface of said tube.

2. The hinge of claim 1 further comprising a flange, said flange stopping a rotation of said tube relative to said semicircular piece where said flange contacts one edge of said opening of said semicircular piece.

3. The hinge of claim 1 wherein said weep hole in said side wall of said tube is located intermediate between a first end and a second end of said tube.

4. The hinge of claim 1, further comprising at least two weep holes.

* * * * *